United States Patent
Sasabuchi

(10) Patent No.: US 10,150,478 B2
(45) Date of Patent: Dec. 11, 2018

(54) SYSTEM AND METHOD FOR PROVIDING A NOTIFICATION OF AN AUTOMATED RESTART OF VEHICLE MOVEMENT

(71) Applicant: Honda Motor Co., Ltd., Tokyo (JP)

(72) Inventor: Yoji Sasabuchi, Rancho Palos Verdes, CA (US)

(73) Assignee: Honda Motor Co., Ltd., Tokyo (JP)

(*) Notice: Subject to any disclaimer, the term of this patent is extended or adjusted under 35 U.S.C. 154(b) by 65 days.

(21) Appl. No.: 15/498,528

(22) Filed: Apr. 27, 2017

(65) Prior Publication Data

US 2018/0312164 A1    Nov. 1, 2018

(51) Int. Cl.
| | |
|---|---|
| *B60W 30/17* | (2012.01) |
| *B60W 30/18* | (2012.01) |
| *B60W 50/14* | (2012.01) |
| *B60W 40/09* | (2012.01) |
| *F02N 11/08* | (2006.01) |
| *B60W 10/06* | (2006.01) |
| *B60W 10/02* | (2006.01) |
| *B60W 40/08* | (2012.01) |

(52) U.S. Cl.
CPC ............ *B60W 30/17* (2013.01); *B60W 30/18* (2013.01); *B60W 50/14* (2013.01); *B60W 40/09* (2013.01); *B60W 2040/0818* (2013.01); *B60W 2040/0827* (2013.01); *B60W 2520/04* (2013.01); *B60W 2550/14* (2013.01); *B60W 2720/106* (2013.01)

(58) Field of Classification Search
CPC ....... F02N 11/08; B60W 10/06; B60W 10/02; B60W 30/16; B60W 50/14; F02D 45/00
See application file for complete search history.

(56) References Cited

U.S. PATENT DOCUMENTS

| | | | |
|---|---|---|---|
| 6,820,709 B1 | 11/2004 | Zimmermann et al. | |
| 7,386,386 B2 | 6/2008 | Arai et al. | |
| 8,579,764 B2* | 11/2013 | Morita | B60W 10/02 477/173 |
| 2009/0005948 A1* | 1/2009 | Ibrahim | B60W 40/107 701/96 |
| 2010/0180849 A1* | 7/2010 | Senda | F02N 11/0855 123/179.4 |
| 2011/0120789 A1* | 5/2011 | Teraya | B60K 6/445 180/65.25 |
| 2012/0071298 A1* | 3/2012 | Morita | F02N 11/0822 477/167 |
| 2014/0239637 A1* | 8/2014 | Sink | F02N 11/0866 290/31 |

FOREIGN PATENT DOCUMENTS

| | | |
|---|---|---|
| JP | H07201000 | 8/1995 |
| JP | H10166895 | 6/1998 |
| JP | 2008290498 | 12/2008 |

\* cited by examiner

*Primary Examiner* — Yonel Beaulieu
*Assistant Examiner* — Martin A Weeks
(74) *Attorney, Agent, or Firm* — Rankin, Hill & Clark LLP

(57) ABSTRACT

A system and method for providing a notification of an automated restart of vehicle movement that include determining an automated stoppage of the vehicle based on an operation of a low speed follow functionality of the vehicle. The system and method also include measuring a duration of the automated stoppage of the vehicle and determining at least one countermeasure parameter. The system and method further include providing an impulse acceleration for a duration of time during the automated restart of vehicle movement.

20 Claims, 11 Drawing Sheets

SYSTEM AND METHOD FOR PROVIDING A NOTIFICATION OF AN AUTOMATED RESTART OF VEHICLE MOVEMENT

BACKGROUND

Currently many vehicles may include an adaptive cruise control functionality that allows a vehicle to be safely operated while a cruise control system is actuated. In many cases, the adaptive cruise control functionality allows the vehicle to slow its speed from a set cruising speed to a lower cruising speed when a preceding vehicle is present and is determined to be slowing down. In many systems, when the preceding vehicle comes to a complete stop, the adaptive cruise control functionality stops the vehicle and restarts vehicle movement if the preceding vehicle restarts movement within a predetermined period of time (e.g., three seconds).

Due to an improvement in technology, many current systems allow automatically restarting the vehicle movement in such situations for longer periods of time after the vehicle is automatically stopped by the automated cruise control functionality. For example, recent technologies may allow automatic restarting of vehicle movement ten seconds after the vehicle was automatically stopped without any action by a driver of the vehicle. Therefore, there is a possibility that the vehicle may move forward while the driver is inattentive.

BRIEF DESCRIPTION

According to one aspect, a computer-implemented method for providing a notification of an automated restart of vehicle movement that includes determining an automated stoppage of a vehicle based on an operation of a low speed follow functionality of the vehicle. The method also includes measuring a duration of the automated stoppage of the vehicle. The method further includes providing an impulse acceleration for a duration of time during the automated restart of the vehicle movement. At least one of an amount of the impulse acceleration and the duration of time is based on the duration of the automated stoppage of the vehicle.

According to another aspect, a system for providing a notification of an automated restart of vehicle movement. The system includes a memory storing instructions when executed by a processor cause the processor to determine an automated stoppage of a vehicle based on an operation of a low speed follow functionality of the vehicle. The instructions also cause the processor to measure a duration of the automated stoppage of the vehicle. The instructions further cause the processor to provide an impulse acceleration for a duration of time during an automated restart of vehicle movement. At least one of an amount of the impulse acceleration and the duration of time is based on the duration of the automated stoppage of the vehicle.

According to still another aspect, a non-transitory computer readable storage medium stores instructions that, when executed by a computer, which includes at least a processor, causes the computer to perform a method that includes determining an automated stoppage of a vehicle based on an operation of a low speed follow functionality of the vehicle. The instructions also include measuring a duration of the automated stoppage of the vehicle. The instructions further include providing an impulse acceleration for a duration of time during an automated restart of vehicle movement. At least one of an amount of the impulse acceleration and the duration of time is based on the duration of the automated stoppage of the vehicle.

DETAILED DESCRIPTION

Figure 1:
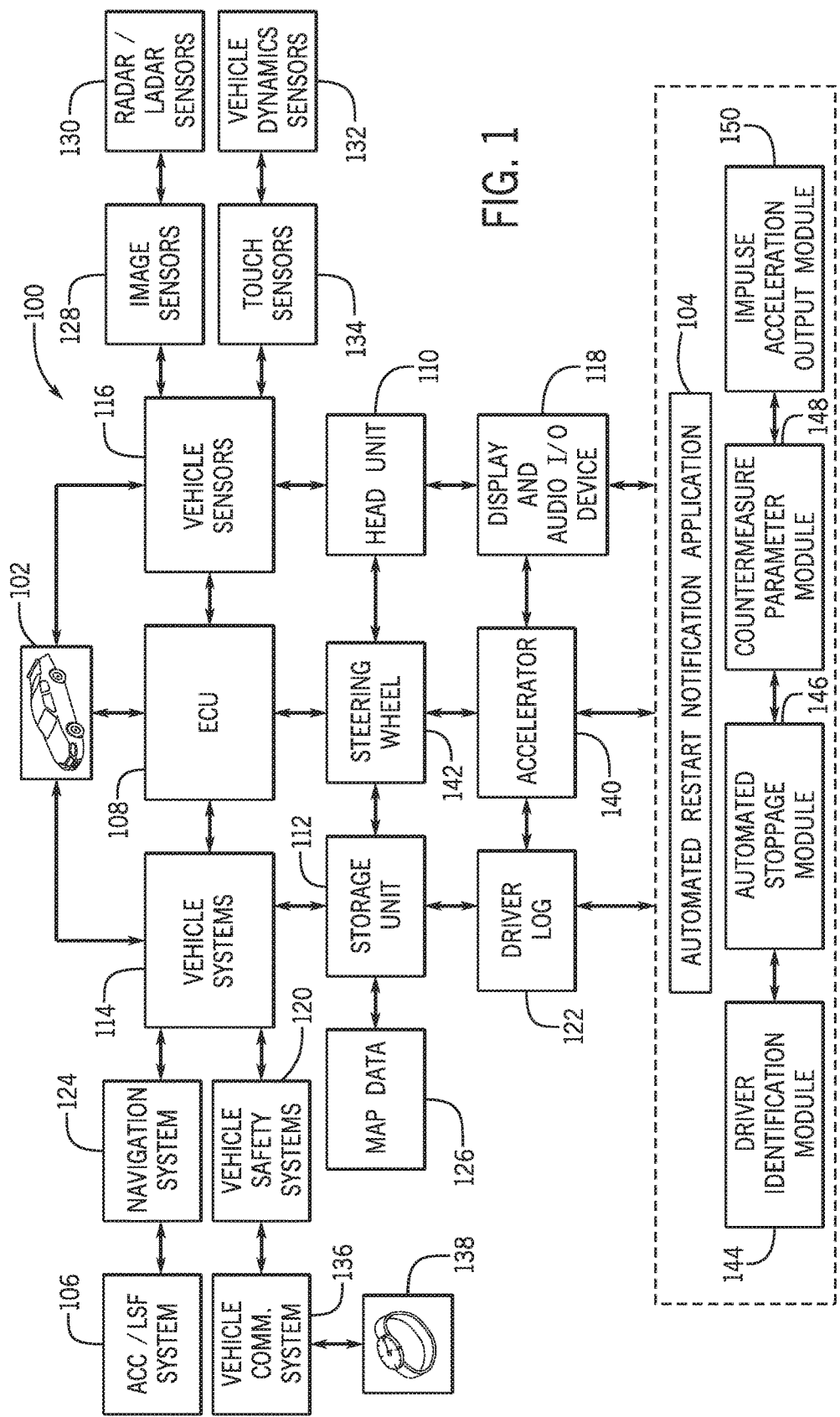
FIG. 1 is a schematic view of an operating environment for implementing systems and methods for providing a notification of an automated restart of vehicle movement according to an exemplary embodiment.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "database", as used herein may refer to table, a set of tables, a set of data stores and/or methods for accessing and/or manipulating those data stores. Some databases may be incorporated with a disk as defined above.

A "memory", as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "vehicle system", as used herein may include, but is not limited to, any automatic or manual systems that may be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

A "wearable computing device", as used herein may include, but is not limited to, a computing device component (e.g., a processor) with circuitry that may be worn by and/or in possession of a user. In other words, a wearable computing device is a computer that is subsumed into the personal space of a user. Wearable computing devices may include a display and may include various sensors for sensing and determining various parameters associated with a user. For example, location, motion, and biosignal (physiological) parameters, among others. Some wearable computing devices have user input and output functionality. Exemplary wearable computing devices may include, but are not limited to, watches, glasses, clothing, gloves, hats, shirts, jewelry, rings, earrings necklaces, armbands, shoes, earbuds, headphones and personal wellness devices.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an operating environment 100 for implementing systems and methods for providing a notification of an automated restart of vehicle movement according to an exemplary embodiment. The components of environment 100, as well as the components of other systems, hardware architectures, and software architectures discussed herein, may be combined, omitted, or organized into different architectures for various embodiments.

Generally, components of the environment 100 are utilized with respect to a vehicle 102. The environment 100 includes an automated restart notification application 104 (herein after simply referred to as an automated restart application) for providing a notification to a driver of a vehicle 102 that includes an adaptive cruise control/low speed follow system (ACC/LSF system) 106 when the vehicle 102 is being automatically restarted from an automated stopped state that is actuated by the ACC/LSF system 106. As described in more detail below, the automated restart application 104 may receive and evaluate/analyze a plurality of data to provide an amount (e.g., intensity, level) of an impulse acceleration G for a duration of time T during the automated restart of the vehicle movement.

The automated restart application 104 may provide the amount of impulse acceleration G for the duration of time T as a notification to the driver of the vehicle 102 that the movement of the vehicle 102 is automatically being restarted after the stopped state by the ACC/LSF system 106. The impulse acceleration G is provided at a higher amount G than a normal restart acceleration of the vehicle 102. The normal restart acceleration may include an amount of acceleration G that is provided as the restart acceleration during the restarting of vehicle movement when a preceding vehicle restarts movement within a predetermined period of time during low speed following of the preceding vehicle. Therefore, the automated restart application 104 may determine and/or adjust the amount of impulse acceleration (e.g., 0.3G) for the duration of time (T=0.3 second) above the normal restart acceleration (e.g., 0.2G) to alert the driver of the vehicle 102 that the automated restart of the vehicle movement is occurring by the ACC/LFS system 106.

The ACC/LSF system 106 of the vehicle 102 may be included within a plurality of vehicle systems 114 and may provide adaptive cruise control functionality based on actuation by the driver of the vehicle 102. In one embodiment, a steering wheel 142 of the vehicle 102 may include an input button (not shown) that may be inputted by the driver to enable or disable the adaptive cruise control functionality. In another embodiment, the ACC/LSF system 106 may present one or more user interfaces to the driver of the vehicle 102 through a display and audio input/output device (display and audio I/O device) 118. The one or more user interfaces may include user interface input icon(s) that may be inputted by the driver of the vehicle 102 to enable or disable the adaptive cruise control functionality.

In one embodiment, when the adaptive cruise control functionality of the vehicle 102 is enabled, a low speed following functionality may be actuated when the ACC/LSF system 106 determines via the ECU 108 that the vehicle 102 is under a predetermined speed threshold. When the low speed following functionality is actuated accelerating and/or braking of the vehicle 102 may be controlled by the ACC/LSF system 106 to enable low speed following of the preceding vehicle (not shown). The low speed following of the preceding vehicle ensures that the speed of the vehicle 102 is adjusted according to the speed of the preceding vehicle so that the vehicle 102 safely follows the preceding vehicle on a roadway. Therefore, if the preceding vehicle is fully stopped ahead of the vehicle 102, the ACC/LSF system 106 will provide the automated stoppage of the vehicle 102.

In one embodiment, upon automatically stopping the vehicle 102 by the ACC/LSF system 106, if it is determined that the preceding vehicle restarts moving ahead of the vehicle 102, the system 106 may automatically restart the vehicle movement without any required driver interaction. In particular, the ACC/LSF system 106 may receive inputs from the plurality of vehicle sensors 116 that may allow the system 106 to determine that the preceding vehicle has restarted movement. Upon determining that the preceding vehicle has restarted movement and the preceding vehicle is a predetermined (e.g., safe) distance ahead of the vehicle 102, the ACC/LSF system 106 may actuate automated restart of the movement of the vehicle 102 at the normal restart acceleration of the vehicle 102. As described, the automated restart application 104 provides a varying amount and duration of the impulse acceleration as a notification to the driver of the vehicle 102 of the automated restart of the vehicle movement being provided by the ACC/LSF system 106 based on the duration of the automated stoppage of the vehicle 102 by the system 106 and one or more countermeasure perimeters that may be attributed to the driver of the vehicle 102 and/or the environment of the roadway on which the vehicle 102 is traveling. As discussed, the impulse acceleration G is provided at a higher amount G than a normal restart acceleration of the vehicle 102.

In the illustrative environment of FIG. 1, the vehicle 102 may generally include an electronic control unit (ECU) 108, a head unit 110, a storage unit 112, a plurality of vehicle systems 114, and a plurality of vehicle sensors 116. Generally, the ECU 108 may include a processor (not shown), a memory (not shown), a disk (not shown), and an input/output (I/O) interface (not shown), which are each operably connected for computer communication via a bus (not shown). The I/O interface provides software and hardware to facilitate data input and output between the components of the ECU 108 and other components, networks, and data sources, of the environment 100. As described below, upon receiving one or more signals by the application 104, the ECU 108 may control acceleration of the vehicle 102 by controlling an accelerator 140 of the vehicle 102 to provide the automated restart of the vehicle movement which includes the amount of an impulse acceleration G for the duration of time T as determined by the automated restart application 104.

The ECU 108 may be operably connected for computer communication (e.g., via the bus and/or the I/O interface) to the head unit 110. The head unit 110 may include internal processing memory, an interface circuit, and bus lines (components of the head unit not shown) for transferring data, sending commands, and communicating with the components of the vehicle 102. In one embodiment, the head unit 110 may be connected to the display and audio I/O device 118 that may be utilized to present one or more human machine interfaces (HMI) to provide the driver of the vehicle 102 with various types of information and/or to receive one or more inputs from the driver of the vehicle 102. More specifically, the HMI may pertain to one or more operating systems, vehicle system interfaces, and application interfaces, including interfaces of the automated restart application 104.

Additionally, the display and audio I/O device 118 may provide the driver of the vehicle 102 with one or more visual or audible alerts that may be provided by the automated restart application 104 and one or more vehicle safety systems 120 of the vehicle 102. In particular, as described below, in some embodiments, the automated restart application 104 may include a visual and/or audio alert that may be provided as part of the notification to the driver of the vehicle 102 along with the impulse acceleration G for the duration of time T during the automated restart of the vehicle movement. In some embodiments, the head unit 110 may communicate with one or more haptic devices (not shown) (e.g., haptic steering wheel, haptic seats, haptic gear shifter) that may also alert the driver of the vehicle 102. For instance, the automated restart application 104 may include a haptic feedback that may be provided as part of the notification to the driver of the vehicle 102 along with the impulse acceleration G for the duration of time T during the automated restart of the vehicle movement.

In an exemplary embodiment, the vehicle 102 may additionally include a storage unit 112. The storage unit 112 may store one or more operating systems, applications, associated operating system data, application data, vehicle system and subsystem user interface data, and the like that are executed by the ECU 108 and/or the head unit 110. As will be discussed in more detail below, the storage unit 112 may include a driver log data store (driver log) 122 that may store driving related data pertaining to the driver of the vehicle 102. In one embodiment, the driver log 122 may be associated with a driver profile that may pertain to a specific driver of the vehicle 102 (discussed below). The driver log may keep a log of each trip the vehicle 102 is involved with and may be associated with one or more specific drivers of the vehicle 102. In particular, the driver log 122 may log one or more events that may pertain to the driving of vehicle 102 by the driver.

In one embodiment, the events may include one or more risk incidents that may include accidents in which the vehicle 102 is involved in and/or high risk vehicle maneuvers. The high risk vehicle maneuvers may include risky accident prone driving maneuvers that are signified by a high amount of vehicle swerving, vehicle braking, vehicle wheels slipping, and the like. In one embodiment, the driver log 122 may include data associated with each of the events that may include vehicle dynamics information (e.g., vehicle speed, vehicle braking, vehicle steering, engine RPM, etc.) that are captured by vehicle dynamics sensors 132, as discussed below. The vehicle dynamics information may be associated with the driving event and location coordinates that are associated with the location of the driving event provided by a navigation system 124 of the plurality of vehicle systems 114. As described below, the driver log 122 may be queried by the automated restart application 104 to determine the occurrence of one or more events at one or more locations at which the vehicle 102 is automatically stopped to determine a driver accident risk level as a countermeasure perimeter that is associated with the driver and a location(s) at which the event(s) occurred. The automated restart application 104 may evaluate the driver accident risk level to adjust the amount of impulse acceleration G and the duration of time T during the automated restart of the vehicle movement.

In one or more embodiments, the driver log 122 may additionally store one or more trip logs that pertain to a timeframe associated with each time the vehicle 102 is operated. The one or more trip logs may include starting and stopping times of the vehicle 102 that may pertain to a number of breaks in driving that may be associated with the vehicle 102 during the predetermined period of time that may be set based on the environment the vehicle 102 is being driven in, as determined by the evaluation of map data 126 by the navigation system 124. The driver log 122 may be queried by the automated restart application 104 to evaluate the trip log for a predetermined period of time that may vary based on the environment that the vehicle 102 is being driven (e.g., rural, suburban, downtown, highway, etc.). The evaluation of the trip log may lead to a determination of whether the driver of the vehicle 102 has taken one or more breaks in driving the vehicle 102 during a predetermined period of time prior to the time at which the vehicle 102 is automatically stopped. The automated restart application 104 may evaluate such data to determine a driver tiredness level as a countermeasure perimeter. As discussed below, the automated restart application 104 may evaluate the driver tiredness level to adjust the amount of impulse acceleration G and the duration of time T in which the amount of impulse acceleration G is provided during the automated restart of the vehicle movement.

In one or more embodiments, the wearable device(s) 138 may include biosignal sensors (not shown) for sensing and determining one or more biosignal parameters associated with an individual that may include the driver of the vehicle 102. In one embodiment, the biosignal sensors may sense physiological data and other data associated with the body and biological system of the individual. More specifically, the biometric parameter data may include biosignal data pertaining to but are not limited to, heart information, such as, heart rate, heart rate pattern, blood pressure, oxygen content, etc., brain information, such as, electroencephalogram (EEG) measurements, functional near infrared spectroscopy (fNIRS), functional magnetic resonance imaging (fMRI), etc., digestion information, respiration rate information, salivation information, perspiration information, pupil dilation information, body temperature, muscle strain, as well as other kinds of information related to the autonomic nervous system or other biological systems of the individual.

In one embodiment, the biosignal sensors may provide biometric parameter data specifically associated with the driver of the vehicle 102 that is communicated to the automated restart application 104. Upon receipt of the biometric parameter data, the automated restart application 104 may evaluate the biometric parameter data and may convert the biometric parameter data into values that may be compared to driver alert threshold values to determine the driver tiredness level.

Referring now in more detail to the plurality of vehicle sensors 116, the plurality of vehicle sensors 116 may include the image sensors 128, RADAR/LADAR sensors 130, the vehicle dynamics sensors 132, and touch sensors 134. In one embodiment, the image sensors 128 may include one or more external or internal cameras that may include, but may not be limited to, an infrared camera, a digital camera, a video camera (camera types not individually shown), and the like that may be mounted at one or more areas outside of and/or inside of the vehicle 102. For example the image sensors 128 may include one or more infrared cameras (not shown) that may be mounted on a bumper (not shown), a dashboard (not shown) and/or a ceiling (not shown) of the vehicle 102.

In one or more embodiments, the image sensors 128 may provide a sequence of images/video that may pertain to the identity and the alertness of the driver. In one embodiment, the image sensors 128 may utilize image logic that includes facial recognition logic that may be capable of extracting facial recognition data from the image(s) taken by the image sensors 128. The extracted facial recognition data may be stored and associated with an individual's driver profile. As discussed below, the automated restart application 104 may utilize the facial recognition data to specifically identify the driver of the vehicle 102. As discussed, the application 104 may evaluate the facial recognition data to determine a specific identity of the driver to further evaluate data specifically associated with the driver.

In one or more embodiments, the image sensors 128 may utilize the image logic to determine the biometric parameter data. In particular, the biometric parameter data provided by the image sensors 128 may include, but may not be limited to, data pertaining to behavioral information such as, eye gaze, eye lid movements, mouth movements, facial movements, head movements, body movements, hand postures, hand placement, body posture, gesture recognition, among others. In one embodiment, the biometric parameter data may be received by the automated restart application 104 and may be converted into values that may be compared to driver alert threshold values to determine the driver tiredness level.

The RADAR/LADAR sensors 130 of the plurality of vehicle sensors 116 may include, but may not be limited to, a millimeter wave radar, a laser detection and range sensor, an infrared sensor, a thermal sensor, and the like. Various alternate or additional hardware devices will be apparent for inclusion as the RADAR/LADAR sensors 130. The RADAR/LADAR sensors 130 may be disposed at one or more areas of the vehicle 102 that may include a front bumper, door panels, vehicle mirrors, a rear bumper, a roof, a floorboard, (areas of the vehicle 102 not individually shown) and the like. In one embodiment, the RADAR/LADAR sensors 130 may provide the automated restart application 104 with data that pertains to the presence of objects, the attributes of objects, the conditions of the road, the lighting conditions, the weather conditions, etc. that are included within a surrounding environment of the vehicle 102.

In one embodiment, data provided by the RADAR/LADAR sensors 130 may also be utilized by the automated restart application 104 to adjust the amount of impulse acceleration G and the duration of time T in which the amount of impulse acceleration G is provided during the automated restart of the vehicle movement based on the distance between the vehicle 102 and the preceding vehicle during the automated restart of the vehicle 102. In additional embodiments, the RADAR/LADAR sensors 130 may provide data to the ACC/LSF system 106 and the automated restart application 104. As discussed above, the ACC/LSF system 106 may use the data received from the RADAR/LADAR sensors 130 to provide the adaptive cruise control and low speed follow functionalities.

In one or more embodiments, the vehicle dynamics sensors 132 may communicate with one or more components of the vehicle 102 that may include the ECU 108, an engine (not shown), a transmission (not shown), brakes (not shown), the plurality of vehicle systems 114, and the like to determine the vehicle dynamics information. The vehicle dynamic information may be evaluated by the automated restart application 104 to determine vehicle speed, vehicle braking, vehicle steering, engine RPM, and the like. More specifically, the vehicle dynamics information may be received and evaluated by the automated restart application 104 to build, store, and associate the vehicle dynamics information with the driver log 122 to be utilized at a later point in time by the application 104. For example, the vehicle dynamics sensors 132 may provide vehicle dynamic data to the automated restart application 104 that may be used to provide vehicle dynamics information pertaining to risky accident prone driving maneuvers that may be stored as data associated with the driving event at a specific location and with the driver of the vehicle 102 via the driver log 122.

In an exemplary embodiment, the plurality of vehicle sensors 116 may additionally include touch sensors 134 that may be provided at one or more areas within the vehicle 102 including the steering wheel 142 of the vehicle 102. The touch sensors 134 may include capacitive sensors that may provide touch sensing data to the automated restart application 104. In particular, the touch sensors 134 may be disposed at one or more locations of the steering wheel 142 to provide touch sensing data pertaining to the driver's grasping and/or touching the steering wheel 142 at one or more locations by one or both hands. As discussed below, the automated restart application 104 may evaluate the touch sensing data and may determine a driver steering inattentiveness level as a countermeasure perimeter that may be indicative of the amount of attentiveness the driver of the vehicle 102 is exhibiting with respect to steering the vehicle 102. The driver steering inattentiveness level may be evaluated by the automated restart application 104 to adjust the amount of impulse acceleration G and the duration of time T in which the amount of impulse acceleration G is provided during the automated restart of the vehicle movement.

Referring now in more detail to the plurality of vehicle systems 114, in addition to the ACC/LSF system 106, the plurality of vehicle systems 114 may include, but may not be limited to, the navigation system 124, vehicle safety systems 120, and a vehicle communication system 136. In an exemplary embodiment, the navigation system 124 may be connected to the head unit 110 and the display and audio I/O device 118 to provide navigation and map user interfaces to the driver of the vehicle 102. The navigation system 124 may include a position determination device (e.g., a vehicle GPS sensor) (not shown) that may also be used to localize (i.e., determine the GPS coordinates) the vehicle 102. The navigation system 124 may include its own processor and memory that communicate with the position determination device to determine and provide route guidance to the driver of the vehicle 102. In one or more embodiments, the navigation system 124 may access the map data 126 stored on the storage unit 112 to present the navigation and map user interfaces through the display and audio I/O device 118. The map data 126 may include geographical maps of one or more locations (e.g., countries, regions, cities) in which the vehicle 102 may be driven. The map data 126 may also include locational data that pertains to the one or more locations.

The locational data may include, but is not limited to, terrain data, road layout data, local environment data, lane marker data, point of interest data, accident statistic data, and the like. As discussed below, the automated restart application 104 may communicate with the navigation system 124 to obtain real time locational coordinates (e.g., GPS coordinates) of the vehicle 102 at a point in time that the vehicle 102 is being automatically restarted to query the map data for locational data that pertains to the location (via the real time coordinates) of the vehicle 102. In some embodiments, the automated restart application 104 may use the location data such as terrain data included within the map data 126 to determine a roadway terrain level as a countermeasure perimeter. The roadway terrain level may be evaluated to adjust the amount of impulse acceleration G and the duration of time T in which the amount of impulse acceleration G is provided during the automated restart of the vehicle movement.

In an exemplary embodiment, the vehicle safety systems 120 may include, but may not be limited to, a lane keep assist system, a blind spot monitoring system, a road departure mitigation system, a forward collision warning system, an airbag deployment system, a multi-view camera system, and the like. The plurality of vehicle systems 114 may communicate with the plurality of vehicle sensors 116 to obtain data that may be used to provide respective safety features pertaining to the vehicle 102 that may be used to operate the vehicle 102 in a safe manner by minimizing potential vehicle accidents and the effect of vehicle impact. More specifically, the vehicle safety systems 120 may communicate with image sensors 128, RADAR/LADAR sensors 130, vehicle dynamics sensors 132, and/or touch sensors 134 to obtain data that may be used to provide respective safety features pertaining to the vehicle 102. In some embodiments, the automated restart application 104 may use the data provided by the vehicle safety systems 120 as a countermeasure perimeter to adjust the amount of impulse acceleration G and the duration of time T in which the amount of impulse acceleration G is provided during the automated restart of the vehicle movement.

In one embodiment, the vehicle communication system 136 may include one or more transceivers that are capable of providing wireless computer communications utilizing various protocols to be utilized to send/receive electronic signals internally to components and systems within the vehicle 102 and to external devices including one or more wearable devices 138. The vehicle communication system 136 may communicate one or more data signals that include data received from the wearable device(s) 138 to provide data to the automated restart application 104. As described below, such data may include, but may not be limited to biometric parameter data that may evaluated by the automated restart application 104 to determine the driver tiredness level that pertains to the driver of the vehicle 102 prior to the time at which the vehicle 102 is automatically stopped and/or during the automated stoppage of the vehicle 102.

II. The Automated Restart Notification Application and Related Methods

The components of the automated restart application 104 will now be described according to an exemplary embodiment and with reference to FIG. 1. In an exemplary embodiment, the automated restart application 104 may be stored on the storage unit 112 of the vehicle 102. In alternate embodiments, the automated restart application 104 may be stored on an externally hosted computing infrastructure (not shown) and may be accessed by the vehicle communication system 136 to be executed by the ECU 108 and/or the head unit 110 of the vehicle 102.

In one embodiment, the automated restart application 104 may be automatically enabled based on the enablement of the ACC/LSF system 106 by the driver of the vehicle 102. In an alternate embodiment, the automated restart application 104 may be separately enabled or disabled after the enablement of the ACC/LSF system 106 based on input(s) received on one or more user interfaces that are associated with the application 104 and provided to the driver of the vehicle 102 through the display and audio I/O device 118. In some configurations, the steering wheel 142 of the vehicle 102 may include one or more respective input buttons that may be inputted by the driver to enable or disable the automated restart application 104. In one embodiment, during an initial execution of the automated restart application 104, a driver setup phase of the application 104 may be initiated. The driver setup phase may also be initiated based on a user input provided on the user interface(s) that are associated with the application 104 such that the driver setup phase may be initiated after the initial execution of the automated restart application 104.

During the driver setup phase, the individual using the application 104 may setup a driver profile to designate themselves as the driver (e.g., an authorized driver) of the vehicle 102. For example, the identified driver who has an associated driver profile may include a vehicle owner or a driver that has been authorized to drive and may drive the vehicle 102 on a semi-regular or regular basis. The driver profile may be a stored data packet that include data that identifies the individual as one of the drivers of the vehicle 102 and contains information associated with the specific driver of the vehicle 102. In particular, during the driver setup phase, the automated restart application 104 may present the individual with a driver setup user interface that facilities creation of the driver profile. In some embodiments, the driver profile may be populated with a username and password combination that is associated to the individual. In other embodiments, the driver profile may be populated with a list of connected devices that may include device identification names/numbers associated with one or more portable devices (not shown) (e.g., key fob, mobile phone) that are wirelessly connected (e.g., via a Bluetooth™ connection) to the vehicle 102 to the vehicle communication system 136. The list of connected devices may also include device identification names/numbers associated with the one or more wearable devices 138 that are wirelessly connected to the vehicle communication system 136.

In one embodiment, during setup of the driver profile, the automated restart application 104 may communicate with the image sensors 128 to obtain facial recognition data that may be utilized to identify the individual as the driver of the vehicle 102. As discussed, the image logic utilized by the image sensors 128 may include facial recognition logic that may be capable of extracting facial recognition data from the image data and to store and associate the facial recognition data with the individual's driver profile. Upon completion of the setup of the driver profile, the automated restart application 104 may store the driver profile and associated data on the storage unit 112 to be accessed during an operation phase of the application 104.

In one embodiment, upon setup of the driver profile, the automated restart application 104 may initiate a learning mode of the application 104. During the learning mode, the automated restart application 104 may utilize the image sensors 128 and/or the wearable device(s) 138 to capture baseline biometric data that is specifically associated with the driver of the vehicle 102 and populated within the driver profile of the driver. The baseline biometric data may be captured for a predetermined period of time that may allow the automated restart application 104 to determine baseline (e.g., normal, average) driver biometric parameters when driving the vehicle 102. In other words, the baseline biometric data may be include data that is reflective of normal driving (e.g., non-drowsy) driver behaviors that are conducted as a baseline that is specifically associated with the driver of the vehicle 102.

More specifically, the automated restart application 104 may analyze the baseline biometric data associated with the driver of the vehicle 102 in order to determine the baseline biometric threshold values specifically associated with the driver of the vehicle 102. The baseline biometric threshold values may include values that categorize one or more types of driver tiredness levels by a subset of one or more baseline biometric data ranges specifically associated with the driver of the vehicle 102. In one embodiment, the baseline threshold values may include, but are not limited to, a low driver alert threshold value(s), a medium driver alert threshold value(s), and a high driver alert threshold value(s). As discussed below, the baseline biometric threshold values may be utilized by the automated restart application 104 to determine the driver tiredness level associated with the driver of the vehicle 102 to be further evaluated by the application 104.

In an alternate embodiment, the automated restart application 104 may utilize default biometric threshold values in situations when the baseline biometric threshold values have not been completely determined and/or if the driver of the vehicle 102 has not been identified as being associated with a driver profile stored on the storage unit 112. For example, in a situation where a new or guest driver is driving the vehicle 102, the automated restart application 104 may utilize the default biometric threshold values to determine the driver tiredness level.

In an exemplary embodiment, the operation phase of the automated restart application 104 may be initiated upon completion of the driver setup and learning mode of the application 104. During the operation phase, modules 140-146 of the automated restart application 104 may be utilized to determine, adjust, and provide the amount of impulse acceleration G for the duration of time T during the automated restart of the vehicle movement. In one embodiment, the modules 140-146 of the automated restart application 104 may include a driver identification module 144, an automated stoppage determinant module (automated stoppage module) 146, a countermeasure parameter determinant module (countermeasure parameter module) 148, and an impulse acceleration output module 150.

Upon initialization of the operation phase, the driver identification module 144 may determine the identity of the driver as a specific driver of the vehicle 102 that previously created a driver profile during the setup phase of the application 104. Conversely, an individual that may not have setup the driver profile or may be a guest driver of the vehicle 102 may be classified an unidentified driver. In particular, the driver identification module 144 may communicate with the head unit 110, the image sensors 128, and/or the wearable device(s) 138 to determine if the driver of the vehicle 102 may be identified.

As discussed below, if the driver identification module 144 determines that the identity of the driver of the vehicle 102 (by determining that the user profile exists that is associated to the driver), the application 104 may utilize the biometric parameter data specifically associated with the driver of the vehicle 102 to determine the driver tiredness level and/or data from the driver log 122 to determine an accident risk level associated specifically to the driver. If the driver identification module 144 determines that the driver is not identified and is classified as the unidentified driver, the application 104 may utilize the default biometric threshold values to determine the driver tiredness level.

In one embodiment, the driver identification module 144 may communicate with the vehicle communication system 136 to determine if portable device(s) and/or wearable device(s) 138 are connected to the vehicle 102. If it is determined that the portable device(s) and/or wearable device(s) 138 are connected to the vehicle 102, the vehicle communication system 136 may communicate the device identification names/numbers associated with the connected portable device(s) and/or the wearable device(s) 138. As discussed above, the driver profile associated with the driver of the vehicle 102 may be populated with the device identification names/numbers of the portable device(s) and/ or wearable device(s) 138 being used/worn by the driver. Therefore, the driver identification module 144 may provide a query on the storage unit 112 to determine if a driver profile exists that contains the device identification names/ numbers. If the driver identification module 144 determines that the driver profile exists that contains the device identification names/numbers, the driver identification module 144 may identify the driver and may utilize biometric parameter data specifically associated with the driver and/or data from the driver log 122 specifically associated with the driver.

In another embodiment, the driver identification module 144 may communicate with the head unit 110 to provide a driver identification user interface to the individual through the display and audio I/O device 118. The driver identification user interface may allow the individual to input the username and password combination that has been previously associated to the individual to identify the individual as the driver of the vehicle 102. The driver identification user interface may also provide the individual with the option to select a guest driver user interface input icon that allows the individual to be classified as the unidentified driver of the vehicle 102.

In one embodiment, upon receiving the username and password combination from the individual through the driver identification user interface, the driver identification module 144 may provide a query on the storage unit 112 to determine if a driver profile exists that contains the username and password combination. If the driver identification module 144 determines that the driver profile exists that contains the username and password combination, the driver identification module 144 may identify the driver and may utilize biometric parameter data specifically associated with the driver and/or data from the driver log 122 specifically associated with the driver. Conversely, the driver identification module 144 may determine that the individual is the unidentified driver based on the input of the guest driver user interface icon by the individual.

In one or more embodiments, in addition to or in lieu of evaluating the device identification names/numbers and/or the username and password combination, the driver identification module 144 may communicate with the image sensors 128 to capture one or more images of the individual upon determining that the individual is located within a driver seat (not shown) of the vehicle 102 when the vehicle 102 is enabled. Upon capturing the one or more images of the individual, the image sensors 128 may evaluate the image(s) by the facial recognition logic to extract facial recognition data from the image(s) and may communicate the extracted facial recognition data to the driver identification module 144. As discussed above, the automated restart application 104 may store facial recognition data associated with a driver profile of a specific driver to be accessed and used to identify the driver. Therefore, upon receipt of the extracted facial recognition data, the driver identification module 144 may provide a query on the storage unit 112 to determine if a driver profile exists that is associated with the facial recognition data that matches (e.g., matches within a predetermined error range) the extracted facial recognition data to identify the driver. If the driver profile exists that is associated with the facial recognition data that matches the extracted facial recognition data, the driver identification module 144 may utilize biometric parameter data specifically associated with the driver and/or data from the driver log 122 specifically associated with the driver. Otherwise, the driver identification module 144 may classify the individual as the unidentified driver.

Upon identifying the specific driver or classifying the driver as the unidentified driver, the driver identification module 144 may send one or more signals to the automated stoppage module 146, the countermeasure parameter module 148, and/or the impulse acceleration output module 150 to provide data pertaining to the identified driver and/or unidentified driver. Methods related to one or more processes that are executed by the modules 142-146 of the automated restart application 104 will now be described below.

Figure 2:
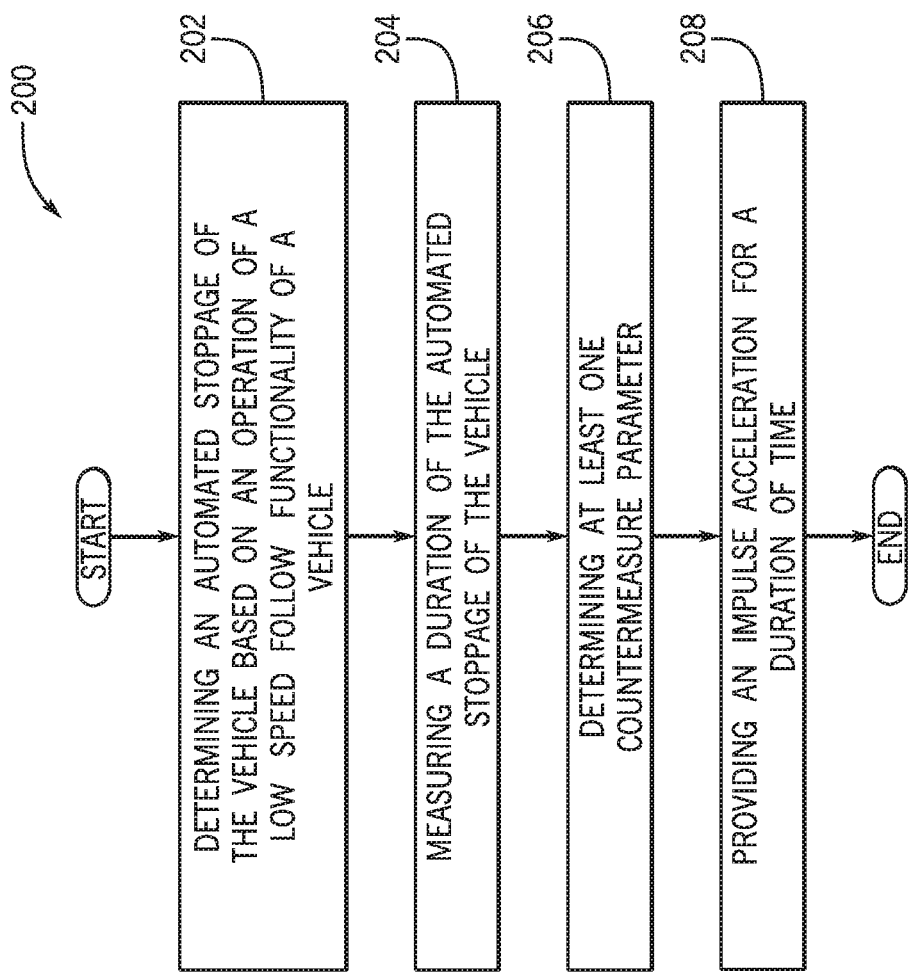
FIG. 2 is a process flow diagram of a method for providing the notification of the automated restart of the vehicle movement according to an exemplary embodiment.

FIG. 2 is a process flow diagram of a method 200 for providing the notification of the automated restart of the vehicle movement according to an exemplary embodiment. FIG. 2 will be described with reference to the components of FIG. 1, though it is to be appreciated that the method of FIG. 2 may be used with other systems/components. The method 200 may begin at block 202, wherein the method 200 may include determining an automated stoppage of the vehicle 102 based on an operation of a low speed follow functionality of the vehicle 102.

Figure 3:
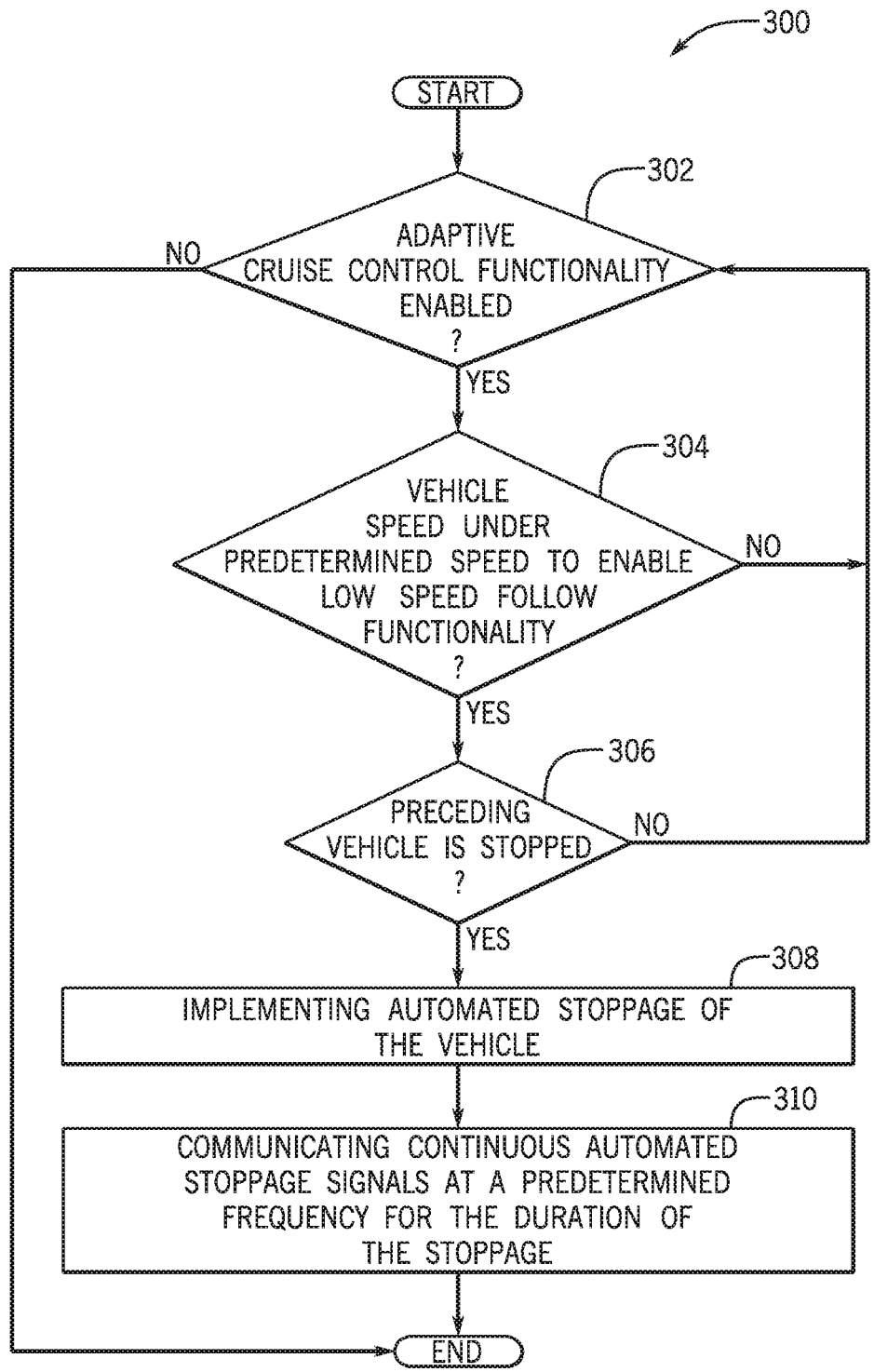
FIG. 3 is a process flow diagram of a method for determining an automated stoppage of the vehicle according to an exemplary embodiment.

FIG. 3 is a process flow diagram of a method 300 for determining the automated stoppage of the vehicle 102 according to an exemplary embodiment. FIG. 3 will be described with reference to the components of FIG. 1, though it is to be appreciated that the method of FIG. 3 may be used with other systems/components. In an exemplary embodiment, the method 300 may begin at block 302, wherein the method 300 may include determining if the adaptive cruise control functionality is enabled. As discussed above, the ACC/LSF system 106 of the vehicle 102 may provide adaptive cruise control functionality based on actuation by the driver of the vehicle 102 through the input button on the steering wheel or user interface input on the user interface(s) presented by the ACC/LSF system 106 of the vehicle 102.

If it is determined that the ACC/LSF system 106 is enabled (at block 302), the method 300 may proceed to block 304, wherein the method 300 may include determining if the vehicle speed is under a predetermined speed threshold to enable a low speed follow functionality. In one embodiment, the ECU 108 may communicate with the ACC/LSF system 106 when the vehicle 102 is under the predetermined speed threshold while the adaptive cruise control functionality is enabled. When the adaptive cruise control functionality is enabled and being used the ECU 108 may determine when the vehicle 102 is under the predetermined speed threshold (e.g., 20 miles per hour) to enable low speed following of the preceding vehicle (not shown). The low speed following of the preceding vehicle may adjust the speed of the vehicle 102 according to the speed of the preceding vehicle based on data provided by the image sensors 128 and/or the RADAR/LADAR sensors 130 to ensure that the vehicle 102 safely follows the preceding vehicle on the roadway.

If it is determined that the vehicle speed is under the predetermined speed threshold (at block 304), the method 300 may proceed to block 306, wherein the method 300 may include determining if the preceding vehicle is stopped. In one embodiment, when utilizing the low speed following functionality, the ACC/LSF system 106 may utilize the image sensors 128 and/or the RADAR/LADAR sensors 130 to determine when the preceding vehicle comes to a complete stop on the roadway ahead of the vehicle 102. More specifically, the image sensors 128 and/or the RADAR/LADAR sensors 130 may sense that the speed of the preceding vehicle is reduced until the preceding vehicle comes to a complete stop and may send one or more data signals to the ACC/LSF system 106 to indicate the stoppage of the preceding vehicle.

If it is determined that the preceding vehicle is stopped (at block 306), the method 300 may proceed to block 308, wherein the method 300 may include implementing automated stoppage of the vehicle 102. In one embodiment, the ACC/LSF system 106 may send one or more command signals to the ECU 108 of the vehicle 102 to enable the automated stoppage of the vehicle 102 based on the stoppage of the preceding vehicle. Upon receiving the command signal(s), the ECU 108 may send respective execution signals to the brakes of the vehicle 102 to implement stopping of the vehicle 102. The ECU 108 may also send respective execution signals to the accelerator 140 to enable a push back feature that may not allow the accelerator 140 to be pushed by the driver during the automated stoppage of the vehicle 102.

The method 300 may proceed to block 310, wherein the method 300 may include communicating continuous automated stoppage signals at a predetermined frequency for the duration of the stoppage. Upon actuation of the automated stoppage and during a course of the automated stoppage of the vehicle 102, the ACC/LSF system 106 may communicate one or more continuous automated stoppage signals at the predetermined frequency (e.g., 1 per millisecond) to the automated stoppage module 146. In an exemplary embodiment, upon receipt of the continuous automated stoppage signal(s) by the ACC/LSF system 106, the automated stoppage module 146 of the automated restart application 104 may determine that the vehicle 102 is automatically stopped by the ACC/LSF system 106 (as oppose to manually stopped by the driver of the vehicle 102).

Referring again to the method 200 presented in FIG. 2, upon determining the automated stoppage of the vehicle 102 based on the operation of the low speed follow functionality of the vehicle 102 (at block 202), the method 200 may proceed to block 204, wherein the method 200 may include measuring a duration of the automated stoppage of the vehicle 102. In an exemplary embodiment, upon determining that the vehicle 102 is automatically stopped, the automated stoppage module 146 may execute a timer that may measure the duration of automated stoppage of the vehicle 102. More specifically, the timer may determine a period of time that the automated stoppage module 146 receives the continuous automated stoppage signal to measure an automated stoppage time that is associated with the particular automated stoppage of the vehicle 102. In particular, the timer may start and continue to measure the automated stoppage time during an entire duration of the automated stoppage of the vehicle 102 until the preceding vehicle starts to move and the automated restart of the vehicle movement occurs. In other words, the automated stoppage time may include a measurement of a total period of time during which the vehicle is stopped until movement of the vehicle 102 is automatically restarted by the ACC/LSF system 106.

Upon measuring the automated stoppage time, the automated stoppage module 146 may be communicate the automated stoppage time to the impulse acceleration output module 150. As discussed below, the impulse acceleration output module 150 may evaluate the automated stoppage time received from the automated stoppage module 146 to provide the amount of impulse acceleration G for the duration of time T during the automated restart of the vehicle movement. In some embodiments, the automated stoppage time may also be stored on the storage unit 112 to be evaluated by the vehicle safety systems 120 to implement one or more safety features that may be actuated during the automated stoppage of the vehicle 102.

With continued reference to the method 200 presented in FIG. 2, upon measuring the duration of the automated stoppage of the vehicle 102 (at block 204), the method 200 may proceed to block 206, wherein the method 200 may include determining at least one countermeasure parameter. As discussed in more detail, the countermeasure parameter module 148 may determine at least one of a driver operation countermeasure parameter and/or a vehicle environment countermeasure parameter that may specifically pertain to the operation of the vehicle 102 by driver of the vehicle 102 and/or may generally pertain to the environment of the roadway on which the vehicle 102 is traveling during the automated stoppage of the vehicle 102.

Figure 4:
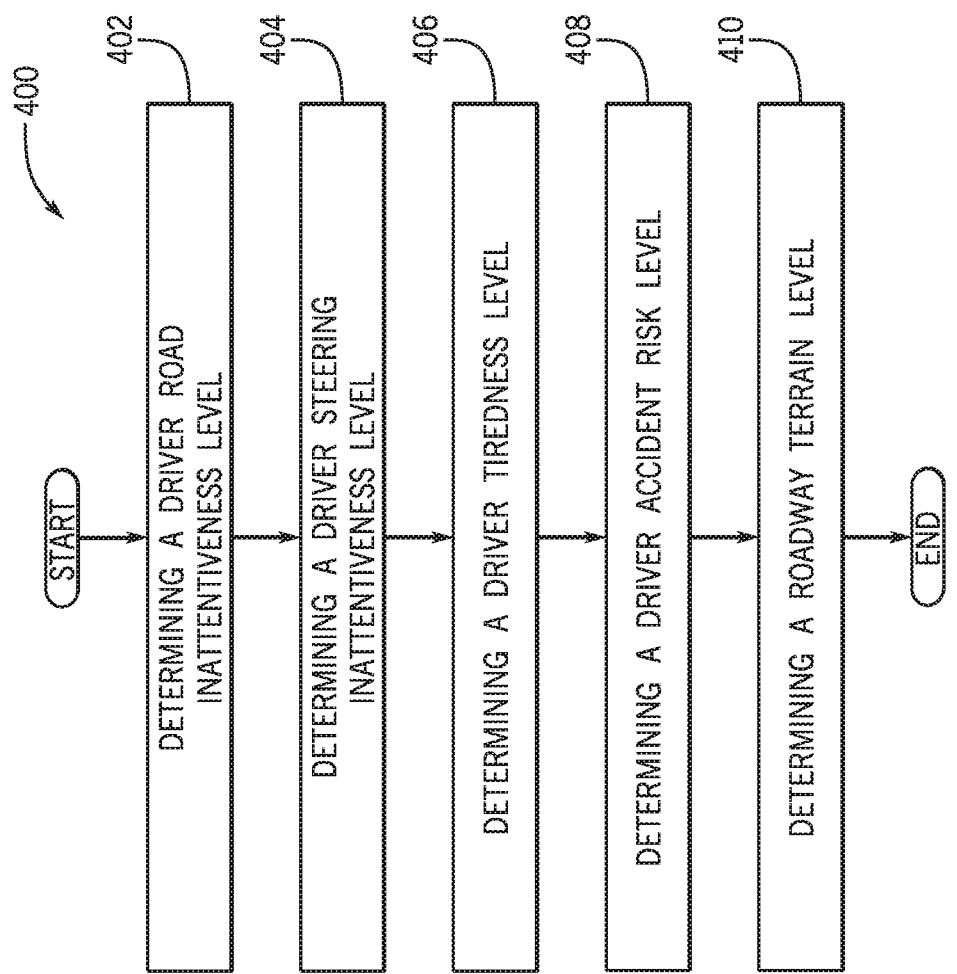
FIG. 4 is a process flow diagram of a method for determining at least one countermeasure parameter according to an exemplary embodiment.

FIG. 4 is a process flow diagram of a method 400 for determining at least one countermeasure parameter according to an exemplary embodiment. FIG. 4 will be described with reference to the components of FIG. 1, though it is to be appreciated that the method of FIG. 4 may be used with other systems/components. In the method of FIG. 4 (discussed below), a specific order of determining and countermeasure parameters is shown, however, it is understood that the method and systems described herein may determine and implement the countermeasure parameters simultaneously or in any selective order. It is to be appreciated that countermeasure parameters in addition to those discussed below with respect to the method 400 may be contemplated in order to be determined by the automated restart application 104.

In an exemplary embodiment, the method 400 may be executed when the ACC/LSF system 106 is determined to have sent the one or more command signals to the brake of the vehicle 102 to provide automated stopping of the vehicle 102. In some embodiments, the method 400 may be executed when the ACC/LSF system 106 is determined to have sent one or more command signals to the accelerator 140 of the vehicle 102 to provide the automated restart of the vehicle movement.

In an exemplary embodiment, the method 400 may begin at block 402, wherein the method 400 may include determining a driver road inattentiveness level. In an exemplary embodiment, the countermeasure parameter module 148 may determine the driver road inattentiveness level as a level that pertains to the driver's safety consciousness to determine if the driver is exhibiting attentiveness to the roadway. In particular, the driver road inattentiveness level may include a value that may vary based on the determination that the driver of the vehicle 102 is looking/facing forward toward the roadway or is repeatedly looking/facing away from the roadway more than a predetermined number of times for a predetermined period of time before and/or during the duration of the automated stoppage of the vehicle 102.

In one embodiment, the countermeasure parameter module 148 may communicate with the image sensors 128 of the vehicle 102 to determine if the driver of the vehicle 102 is exhibiting attention to the roadway. More specifically, the image sensors 128 may capture one or more images of the driver of the vehicle 102 for a predetermined period of time prior to and/or during the automated stoppage of the vehicle 102. The image sensors 128 may utilize image logic to evaluate the one or more images of the driver to determine eye gaze data, head position data, and/or body position data. Upon evaluating the image(s) of the driver, the image sensors 128 may provide the image data that may include data pertaining to the eye gaze, head movements, and/or body position data to the countermeasure parameter module 148 to be evaluated to determine the driver road inattentiveness level.

In particular, the countermeasure parameter module 148 may evaluate the image data to determine if the eye gaze, head position, and/or body position of the driver of the vehicle 102 is looking/facing toward the roadway or is looking/facing away from the roadway (e.g., aside) for one or more number of times during a predetermined period of time before and/or during the duration of the automated stoppage of the vehicle 102. The countermeasure parameter module 148 may calculate a value (e.g., 1-5 score value) that may be associated with the driver based on the number of times the driver may not be looking/facing towards the roadway and may designate the calculated value as the driver road inattentiveness level. In one or more embodiments, the driver road inattentiveness level may include a higher value when the driver is determined to be exhibiting a lower amount of attentiveness for the predetermined period of time before and/or during the duration of the automated stoppage of the vehicle 102. Correspondingly, the driver road inattentiveness level may include a lower value when the driver is determined to be exhibiting a higher amount of attentiveness for the predetermined period of time before and/or during the duration of the automated stoppage of the vehicle 102.

As an illustrative example, if the driver is determined to be looking/facing toward the roadway before and/or during the duration of the automated stoppage of the vehicle 102, the countermeasure parameter module 148 may calculate a value of '1' as the driver road inattentiveness level that may be associated to the driver. However, if the driver is determined to be looking/facing away from the roadway for the predetermined period of time before and/or during the duration of the automated stoppage of the vehicle 102 at a high frequency before and/or during the duration of the automated stoppage of the vehicle 102, the countermeasure parameter module 148 may calculate a higher value of '4.5' as the driver road inattentiveness level that may be associated to the driver.

In an exemplary embodiment, upon determining the driver road inattentiveness level, the countermeasure parameter module 148 may communicate the driver road inattentiveness level to the impulse acceleration output module 150. As discussed below, the impulse acceleration output module 150 may adjust the amount of impulse acceleration G and the duration of time T in which the amount of impulse acceleration G is provided during the automated restart of the vehicle movement based on the driver road inattentiveness level.

Upon determining the driver road inattentiveness level (at block 402), the method 400 may proceed to block 404, wherein the method 400 may include determining a driver steering inattentiveness level. The driver steering inattentiveness level may be determined as a level that pertains to the driver's safety consciousness to determine if the driver is exhibiting attentiveness to steering the vehicle 102. In particular, the driver steering inattentiveness level may include a value that may vary based on the determination that the driver of the vehicle 102 is utilizing one or both hands to grasp the steering wheel 142 of the vehicle 102 for a predetermined period of time before and/or during the duration of the automated stoppage of the vehicle 102.

In an exemplary embodiment, the countermeasure parameter module 148 may communicate with the touch sensors 134 that may be provided on the steering wheel of the vehicle 102 to receive the touch sensing data to determine if the driver of the vehicle 102 is exhibiting attentiveness to steering the vehicle 102. As discussed above, the touch sensing data may pertain to the driver grasping the steering wheel 142 at one or more locations by one or both hands. Upon receipt of the touch sensing data, the countermeasure parameter module 148 may evaluate the touch sensing data to determine if the driver of the vehicle 102 is grasping the steering wheel with any hands, one hand, or both hands for one or more number of times during the period of time before and/or during the duration of the automated stoppage of the vehicle 102.

The countermeasure parameter module 148 may calculate a value (e.g., 1-5 score value) that may be associated to the driver based on the number of times the driver may or may not grasp the steering wheel with any hands, one hand, or with both hands. The countermeasure parameter module 148 may designate the calculated value as the drive steering inattentiveness level. In one or more embodiments, the driver steering inattentiveness level may include a higher value when the driver is determined be exhibiting a lower amount of attention to steering the vehicle for the predetermined period of time before and/or during the duration of the automated stoppage of the vehicle 102. Correspondingly, the driver road inattentiveness level may include a lower value when the driver is determined to be exhibiting a higher amount of attention to steering the vehicle 102 for the predetermined period of time before and/or during the duration of the automated stoppage of the vehicle 102.

As an illustrative example, if the driver is determined to be grasping the steering wheel with both hands before and/or during the duration of the automated stoppage of the vehicle 102, the countermeasure parameter module 148 may calculate a value of '1' as the driver steering inattentiveness level. If the driver is determined to be grasping the steering wheel with one hand during the same timeframe, the countermeasure parameter module 148 may calculate a value of '3' as the driver steering inattentiveness level. However, if the driver is determined to be not grasping the steering wheel for a majority of the same timeframe, the countermeasure parameter module 148 may calculate a higher value of '4.8' as the driver steering inattentiveness level.

In an exemplary embodiment, upon determining the driver steering inattentiveness level, the countermeasure parameter module 148 may communicate the driver steering inattentiveness level to the impulse acceleration output module 150. As discussed below, the impulse acceleration output module 150 may adjust the amount of impulse acceleration G and the duration of time T in which the amount of impulse acceleration G is provided during the automated restart of the vehicle movement based on the driver steering inattentiveness level.

Upon determining the driver steering inattentiveness level (at block 404), the method 400 may proceed to block 406, wherein the method 400 may include determining a driver tiredness level. The driver tiredness level may be determined as a level that pertains to the driver's awareness and alertness while driving the vehicle 102 to determine if the driver is exhibiting attentiveness to driving the vehicle 102 for a predetermined period of time prior to and/or during the duration of the automated stoppage of the vehicle 102. In particular, the driver tiredness level may include a value that may vary based on the determination that the driver of the vehicle 102 is aware and alert. The driver tiredness level may be dependent on the biometric parameter data for the driver that has been identified or that has been classified as an unidentified driver by the driver identification module 144.

In one embodiment, if the driver identification module 144 identifies the specific vehicle driver and sends the corresponding data signals pertaining to the identification of the specific driver to the countermeasure parameter module 148, as discussed above, the countermeasure parameter module 148 may query the driver profile of the identified driver to obtain the baseline threshold values. The baseline threshold values may include the low driver alert threshold value(s), the medium driver alert threshold value(s), and the high driver alert threshold value(s). As discussed, the baseline threshold values may be determined in the learning mode of the automated restart application 104 to provide a customized determination of alertness levels of each specific identified driver.

Upon accessing the baseline threshold values, the countermeasure parameter module 148 may communicate with the wearable device(s) 138 and/or the image sensors 128 to obtain real time biometric parameter data associated with the driver to determine if the driver is exhibiting awareness and alertness with respect to driving the vehicle 102. More specifically, the biosignal sensors of the wearable device(s) 138 may sense physiological data and other data associated with the body and biological system of the driver wearing the wearable device(s) 138 for a predetermined period of time prior to and/or during the automated stoppage of the vehicle 102. The wearable device(s) 138 may communicate the data captured by the biosignal sensors as real time biometric parameter data that is associated with the driver of the vehicle 102.

Alternatively, or additionally, the countermeasure parameter module 148 may communicate with the image sensors 128 to receive the real time biometric parameter data determined by the evaluation of the image logic by the image sensors 128. In particular, the biometric parameter data provided by the image sensors 128 may include data pertaining to behavioral information of the driver of the vehicle 102. The image sensors 128 may utilize the image logic to evaluate the one or more images of the driver of the vehicle 102 captured for a predetermined period of time prior to and/or during the automated stoppage of the vehicle 102. The image logic may evaluate the image(s) to define behavioral information such as eye gaze data and head position data that may be utilized to determine the real time biometric parameter data that is provided to the countermeasure parameter module 148.

In one embodiment, upon receipt of the real time biometric parameter data from the wearable device(s) 138 and/or the image sensors 128, the countermeasure parameter module 148 may compare one or more data points derived from the real time biometric parameter data to the baseline threshold values obtained from the storage unit 112. The comparison between the one or more data points and the baseline threshold values may be used to determine if the real time biometric parameter data associated with the identified driver of the vehicle 102 falls under or over the low driver alert threshold value(s), the medium driver alert threshold value(s), and the high driver alert threshold value(s). Based on this comparison, the countermeasure parameter module 148 may calculate a value (e.g., 1-5 score value) that may be associated to the identified driver.

The calculated value may signify the driver's tiredness while driving the vehicle 102 during a predetermined period of time before and/or during the duration of the automated stoppage of the vehicle 102 and may be designated as the driver tiredness level by the countermeasure parameter module 148. In one or more embodiments, the driver tiredness level may include a higher value when the driver is determined be exhibiting a lower amount of awareness and alertness while driving the vehicle 102 for the predetermined period of time before and/or during the duration of the automated stoppage of the vehicle 102. Correspondingly, the driver road inattentiveness level may include a lower value when the driver is determined to exhibiting a higher amount of awareness and alertness while driving the vehicle 102 for the predetermined period of time before and/or during the duration of the automated stoppage of the vehicle 102.

As an illustrative example, if the driver of the vehicle 102 is identified by the driver identification module 144, the biometric threshold values specifically derived from the biometric parameter data associated with the driver may be utilized to compare against real time biometric data associated to the driver. If one or more data points derived from the real time biometric data are above the low driver alert threshold value(s) of the biometric threshold values, the countermeasure parameter module 148 may calculate a value of "1" as the driver tiredness level. In other words, the real time biometric data may signify that biometric parameters captured of the driver indicate that the driver exhibits an amount of awareness and/or alertness that is determined as being normal for the specific driver. However, if the one or more data points derived from the real time biometric data are below the low driver alert threshold value(s), then the countermeasure parameter module 148 may calculate a value of "4" as the driver tiredness level. In other words, the real time biometric data may signify that biometric parameters captured of the driver indicate that the driver exhibits an amount of awareness and alertness that is determined as being low for the specific driver.

In another embodiment, if the driver identification module 144 does not identify the specific driver of the vehicle 102 and instead classifies the driver as the unidentified driver, the driver identification module 144 may compare the real time biometric parameter data received from the wearable device(s) 138 and/or the image sensors 128 against the default biometric threshold values to determine the driver tiredness level for the driver classified as an unidentified driver. More particularly, the countermeasure parameter module 148 may compare one or more data points derived from the real time biometric parameter data to default threshold values that may indicate two or more levels of alertness (e.g., low, medium, and high). Based on this comparison, the countermeasure parameter module 148 may calculate a value (e.g., 1-5 score value) that may be associated to the unidentified driver. The calculated value may signify the driver's awareness and alertness while driving the vehicle 102 during the predetermined period of time before and/or during the duration of the automated stoppage of the vehicle 102 and may be designated as the driver tiredness level by the countermeasure parameter module 148. It is to be appreciated that even though the default biometric threshold values may not provide customized threshold values that may pertain to the specific (identified) driver of the vehicle 102, the default biometric threshold values will provide a general determination as to the awareness and alertness of the unidentified driver of the vehicle 102.

In an additional embodiment, if the driver is identified by the driver identification module 144, the driver tiredness level may be determined by the countermeasure parameter module 148 based on the occurrence in breaks in driving derived from the one or more trip logs stored as part of the driver log 122. As discussed, the driver log 122 may store the one or more trip logs that pertains to the timeframe of each time the vehicle 102 is operated. The countermeasure parameter module 148 may query the driver profile associated with the identified driver for the driver log 122 associated with the driver of the vehicle 102. Upon determining the driver log 122, the countermeasure parameter module 148 may evaluate the trip log that contains data that pertains to the vehicle dynamics associated with the vehicle 102 to determine if the driver has taken one or more breaks in driving the vehicle 102 during the predetermined period of time that may be set based on the environment the vehicle 102 is being driven in prior to the automated stoppage of the vehicle 102.

In particular, the countermeasure parameter module 148 may evaluate the trip log to determine if the driver took any breaks in driving the vehicle 102 for the predetermined period of time. The countermeasure parameter module 148 may calculate a value that may be associated to the number of breaks in driving the driver took during the predetermined period of time and may convert the calculated value into a level that corresponds with the driver's awareness and alertness. The countermeasure parameter module 148 may designate the converted value as the driver tiredness level. In some embodiments, the countermeasure parameter module 148 may also communicate with the navigation system of the vehicle 102 to obtain traffic data from the map data that pertains to the real time location of the vehicle 102. The traffic data may also be utilized by the countermeasure parameter module 148 along with the number of breaks in driving when calculating and converting the value that may be designated as the driver tiredness level.

As an illustrative example, if the driver is determined to have taken more than one break in driving for the predetermined period of time of one hour prior to the automated stoppage of the vehicle 102, and the vehicle 102 is determined to be traveling in a light traffic environment, the countermeasure parameter module 148 may calculate a value of '1.4' as the driver tiredness level that may be associated with the driver. However, if the driver is determined to not have taken any breaks in driving for the predetermined period of time of one hour prior to the automated stoppage of the vehicle 102, and the vehicle 102 is determined to be traveling in a heavy traffic environment, the countermeasure parameter module 148 may calculate a higher value of '4.2' as the driver tiredness level that may be associated with the driver.

In an exemplary embodiment, upon determining the driver tiredness level based on data received from the wearable device(s) 138, image sensors 128, and/or the driver log 122, the countermeasure parameter module 148 may communicate the driver tiredness level to the impulse acceleration output module 150. As discussed below, the impulse acceleration output module 150 may adjust the amount of impulse acceleration G and the duration of time T in which the amount of impulse acceleration G is provided during the automated restart of the vehicle movement based on the driver tiredness level.

With continued reference to FIG. 4, upon determining the driver tiredness level (at block 406), the method 400 may proceed to block 408, wherein the method 400 may include determining a driver accident risk level. The driver accident risk level may be determined for the driver of the vehicle 102 identified by the driver identification module 144 as a level of accident risk that occurs at the specific location in which the vehicle 102 is located during the automated stoppage of the vehicle 102. In other words, the driver accident risk level may be indicative of a level of accident risk that may occur at the location at which the movement of the vehicle 102 will be automatically restarted by the ACC/LSF system 106 based on an accident history and/or as historic vehicle dynamics data indicative of high risk vehicle maneuvers (e.g., near accidents) that occurred at the location.

In one embodiment, if the driver identification module 144 identifies the specific vehicle driver and sends the corresponding data signals pertaining to the identified driver to the countermeasure parameter module 148, as discussed above, the countermeasure parameter module 148 may query the driver profile of the identified driver. In particular, the countermeasure parameter module 148 may query the driver profile of the identified driver to obtain the driver log 122 that may store the one or more risk incidents associated with the identified driver of the vehicle 102. As discussed above, the one or more risk incidents may be indicative of past accidents in which the vehicle 102 is involved in and/or high risk vehicle maneuvers which may include risky accident prone driving maneuvers that are signified by a high amount of vehicle swerving, vehicle braking, and the like. The driver log 122 may include data associated with each of the events that may include vehicle dynamics information (e.g., vehicle speed, vehicle braking, vehicle steering, engine RPM, etc.) associated with the driving event and the location coordinates associated with the location of the driving event provided by the navigation system 124.

In one embodiment, upon the automated stoppage of the vehicle 102, the countermeasure parameter module 148 may communicate with the navigation system 124 to determine the real time locational coordinates of the location at which the vehicle 102 is stopped. Upon determining the real time location coordinates of the location, the countermeasure parameter module 148 may provide a query on the driver log to acquire one or more risk incidents that may be associated to locational real time coordinates that may be within a predetermined distance of the real time locational coordinates. In other words, the countermeasure parameter module 148 may provide a query on the driver log to acquire one or more risk incidents that may have occurred within a predetermined distance of the real time (current) location of the vehicle 102 as the vehicle 102 is automatically stopped.

In an exemplary embodiment, the countermeasure parameter module 148 may calculate a value (e.g., 1-5 score value) that may be based on the acquisition of the one or more risk incidents that are associated to locational real time coordinates that are within a predetermined distance of the real time locational coordinates. Additionally, the value may be based on the type of risk incident(s) that are acquired. The countermeasure parameter module 148 may evaluate the type of risk incident(s) to determine if the risk incident(s) include prior accidents in which the vehicle 102 was involved or high risk vehicle maneuvers that took place within the predetermined distance of the real time location of the vehicle 102 during the automated stoppage of the vehicle 102. Upon calculating the value, the countermeasure parameter module 148 may designate the calculated value as the driver accident risk level. In one or more embodiments, the driver accident risk level may include a higher value when it is determined that one or more instances of prior accidents and/or high risk vehicle maneuvers occurred within the predetermined distance of the (real time) location at which the vehicle 102 is located during the duration of the automated stoppage of the vehicle 102. Correspondingly, the driver accident risk level may include a lower value when it is determined that no instances of prior accidents and/or none or only a few instances of high risk vehicle maneuvers occurred within the predetermined distance of the (real time) location at which the vehicle 102 is located during the duration of the automated stoppage of the vehicle 102.

As an illustrative example, the navigation system 124 provides the real time locational coordinates of the vehicle 102 that has been automatically stopped by the ACC/LSF system 106. If the countermeasure parameter module 148 queries the driver log to find the locational coordinates that are within the predetermined distance of the real time locational coordinates and retrieves one risk incident associated with the driver of the vehicle 102, the countermeasure parameter module 148 may calculate a value of '0.5' as the driver accident risk level. Alternatively, if the countermeasure parameter module 148 queries the driver log to find the locational coordinates that are within the predetermined distance of the real time locational coordinates and retrieves multiple risk incidents associated with the driver of the vehicle 102, the countermeasure parameter module 148 may evaluate the risk incidents. In particular, the countermeasure parameter module 148 may evaluate the multiple risk incidents to determine if the risk incident(s) include an occurrence(s) of past accidents in which the vehicle 102 was involved and/or risky accident prone driving maneuvers while the vehicle 102 was being driven by the identified driver of the vehicle 102.

In the illustrative example, if the countermeasure parameter module 148 determines that the risk incident(s) include an occurrence(s) of two prior risky accident prone driving maneuvers that occurred within the predetermined distance of the real time location of the vehicle 102, the countermeasure parameter module 148 may calculate a higher value of '2.8' as the driver risk level. However, the countermeasure parameter module 148 determines that the risk incident(s) include an occurrence(s) of numerous prior risky accident prone driving maneuvers and numerous past accidents that occur within the predetermined distance of the real time location of the vehicle 102, the countermeasure parameter module 148 may calculate a more higher value of '4.7' as the driver accident risk level.

In an exemplary embodiment, upon determining the driver accident risk level, the countermeasure parameter module 148 may communicate the driver accident risk level to the impulse acceleration output module 150. As discussed below, the impulse acceleration output module 150 may adjust the amount of impulse acceleration G and the duration of time T in which the amount of impulse acceleration G is provided during the automated restart of the vehicle movement based on the driver accident risk level.

Upon determining the driver accident risk level (at block 408), the method 400 may proceed to block 410, wherein the method 400 may include determining a roadway terrain level. In one embodiment, the countermeasure parameter module 148 may communicate with the navigation system 124 to determine real time locational coordinates of the location at which the vehicle 102 is stopped. Upon determining the real time location coordinates of the location, the countermeasure parameter module 148 may provide a query on the map data 126 stored on the storage unit 112 to acquire terrain data included within the map data 126. In particular, the terrain data may be associated with the roadway at the location at which the vehicle 102 is automatically stopped retrieved based on the query of the real time locational coordinates of the vehicle 102. As discussed above, the terrain data may be indicative of the terrain of the roadway on which the automated stoppage of the vehicle 102 has occurred. For example, the terrain data may indicate that the roadway may be flat, sloping uphill at a specific angle, or sloping downhill at a specific angle and at specific locational coordinates.

Upon providing the query on the map data 126 stored on the storage unit 112, the countermeasure parameter module 148 may determine the terrain data associated with the location of the vehicle 102 based on the real time locational coordinates. The countermeasure parameter module 148 may evaluate the terrain data and determine a terrain level that may be indicative of the level and direction of slope of the roadway at the location at which the automated stoppage of the vehicle 102 has occurred. The countermeasure parameter module 148 may calculate a value (e.g., 1-5 score value) that may be associated to the terrain level and may designate the calculated value as the roadway terrain level. In one or more embodiments, the terrain level may include a higher value when the roadway on which the vehicle 102 is sloping uphill. Correspondingly, the terrain level may include a lower value when the roadway on which the vehicle 102 is sloping downhill.

As an illustrative example, the navigation system 124 provides the real time locational coordinates of the vehicle 102 that has been automatically stopped by the ACC/LSF system 106. If the countermeasure parameter module 148 queries the map data 126 to acquire the terrain data associated with the real time location of the vehicle 102 and determines that the terrain level of the roadway is indicative of a flat surface, the countermeasure parameter module 148 may calculate a value of '2.5' as the roadway terrain level. Alternatively, if the countermeasure parameter module 148 evaluates the map data and determines that the terrain level of the roadway is indicative of a downward sloping surface, the countermeasure parameter module 148 may calculate a lower value of '1.5' that may also be based on the angle of the downward slope. However, if the countermeasure parameter module 133 evaluates the map data and determines that the terrain level of the roadway is indicative of an upward sloping surface, the countermeasure parameter module 148 may calculate a higher value of '3.75' that may also be based on the angle of the upward slope.

In an exemplary embodiment, upon determining the roadway terrain level, the countermeasure parameter module 148 may communicate the roadway terrain level to the impulse acceleration output module 150. As discussed below, the impulse acceleration output module 150 may adjust the amount of impulse acceleration G and the duration of time T in which the amount of impulse acceleration G is provided during the automated restart of the vehicle movement based on the roadway terrain level.

Referring again to the method 200 presented in FIG. 2, upon determining the at least one countermeasure parameter (at block 206), the method 200 may proceed to block 208, wherein the method 200 may include providing an impulse acceleration for a duration of time. As discussed below, an amount of the impulse acceleration and the duration of time may be based on the duration of the automated stoppage of the vehicle 102 and the at least one countermeasure parameter. As discussed, the varying amount of automated stoppage may be provided for a varying duration of time based on measured duration of the automated stoppage of the vehicle 102 and one or more of the countermeasure parameters discussed above, with respect to the method 400.

Figure 5:
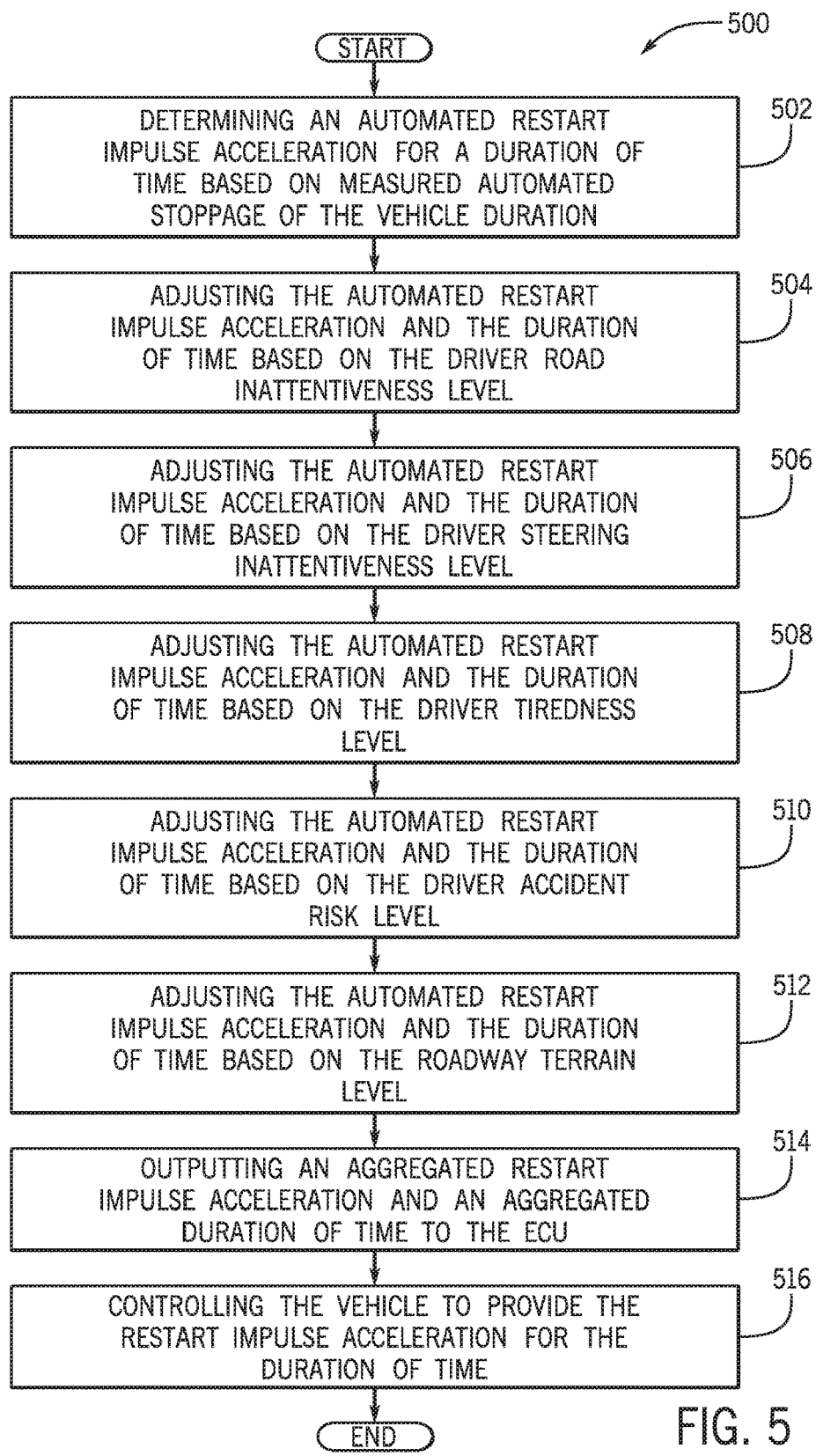
FIG. 5 is a process flow diagram of a method for providing an impulse acceleration for a duration of time according to an exemplary embodiment.

FIG. 5 is a process flow diagram of a method 500 for providing an impulse acceleration for a duration of time according to an exemplary embodiment. FIG. 5 will be described with reference to the components of FIG. 1, though it is to be appreciated that the method of FIG. 5 may be used with other systems/components. In the method of FIG. 5 (discussed below), a specific order of adjusting the automated restart impulse acceleration and the duration of time that the restart impulse acceleration takes place is shown, however, it is understood that the method and systems described herein may determine and implement the countermeasure parameters simultaneously or in any selective order. It is to be appreciated that countermeasure parameters in addition to those discussed below with respect to the method 500 may be contemplated in order to be adjust the automated restart impulse acceleration and the duration of time that the restart impulse acceleration takes place.

The method 500 may begin at block 502, wherein the method 500 may include determining the automated restart impulse acceleration for a duration of time based on the measured automated stoppage of the vehicle 102 implemented by the ACC/LSF system 106 during the low speed following of the preceding vehicle. As discussed above, upon determining that the vehicle 102 is automatically stopped, the automated stoppage module 146 may execute a timer that may measure the duration of automated stoppage of the vehicle 102. Upon measuring the duration of the automated stoppage of the vehicle 102, the automated stoppage module 146 may communicate the duration of the automated stoppage of the vehicle 102 to the impulse acceleration output module 150.

Figure 6A:
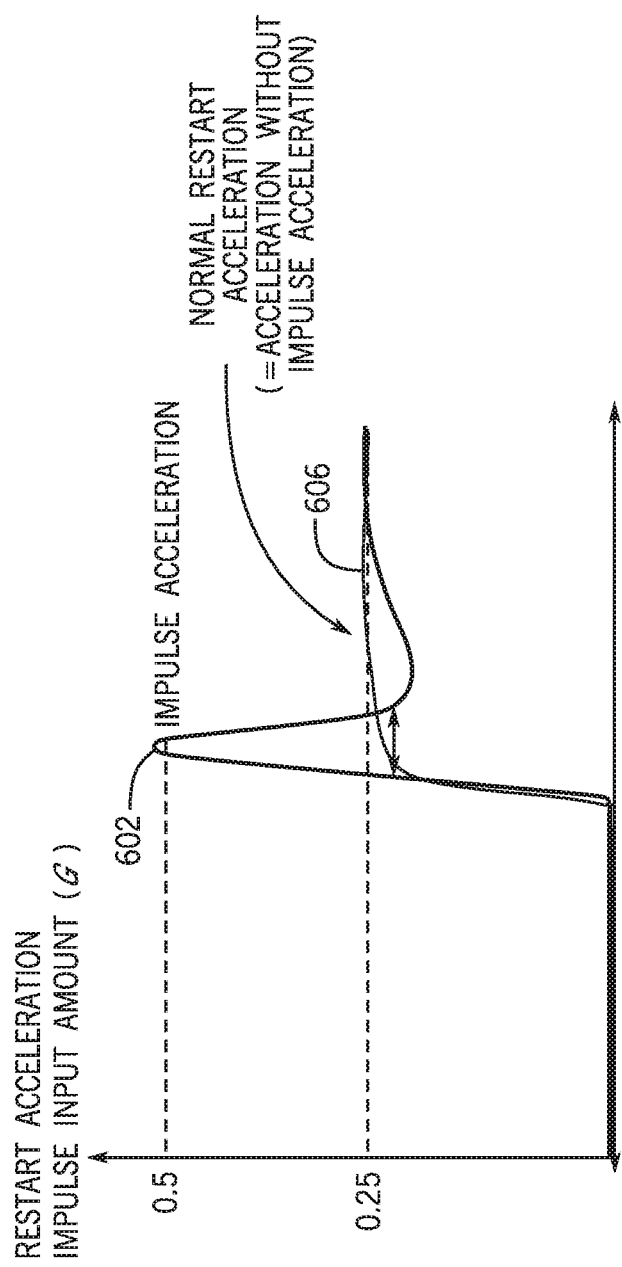
FIG. 6A is an illustration of an example of an amount of impulse acceleration and a duration of the impulse acceleration being set based on a measured duration of the automated stoppage according to an exemplary embodiment.

In one embodiment, upon receipt of measured duration of the automated stoppage of the vehicle 102, the impulse acceleration output module 150 may determine the amount of the impulse acceleration output and the duration of the impulse acceleration output based on the measured duration of the automated stoppage of the vehicle 102. More specifically, as shown in FIG. 6A, an illustrative example of the amount of impulse acceleration 602 and the duration of the impulse acceleration 602 being set based on the measured duration of the automated stoppage is presented. As illustrated, the amount of the impulse acceleration 602 may be output at a duration of time 604 that are both based on the measured duration of the automated stoppage of the vehicle 102. As shown, the impulse acceleration 602 is provided at a higher amount than the normal restart acceleration 606 of the vehicle 102. In one embodiment, the application 104 may not send the one or more signals to the ECU 108 when the measured duration of the automated stoppage falls under a predetermined threshold. For example, if the measured duration of the automated stoppage falls under a predetermined threshold, the impulse acceleration 602 may not be provided and the normal restart acceleration 606 may be provided. Therefore, the impulse acceleration 602 may be provided when the measured duration of the automated stoppage falls over the predetermined threshold.

Upon determining the automated restart impulse acceleration and the duration of time (at block 502), the method 500 may proceed to block 504, wherein the method 500 may include adjusting the automated restart impulse acceleration and the duration of time of the restart impulse acceleration based on the driver road inattentiveness level. As discussed above (with reference to block 402 of the method 400), upon determining the driver road inattentiveness level, the countermeasure parameter module 148 may communicate the driver road inattentiveness level to the impulse acceleration output module 150. In one embodiment, upon receipt of the driver road inattentiveness level, the countermeasure parameter module 148 may adjust the amount of impulse acceleration G and the duration of time T of the impulse acceleration G based on the driver road inattentiveness level to provide a level of notification that may partly correspond to the level of road inattentiveness.

Figure 6B:
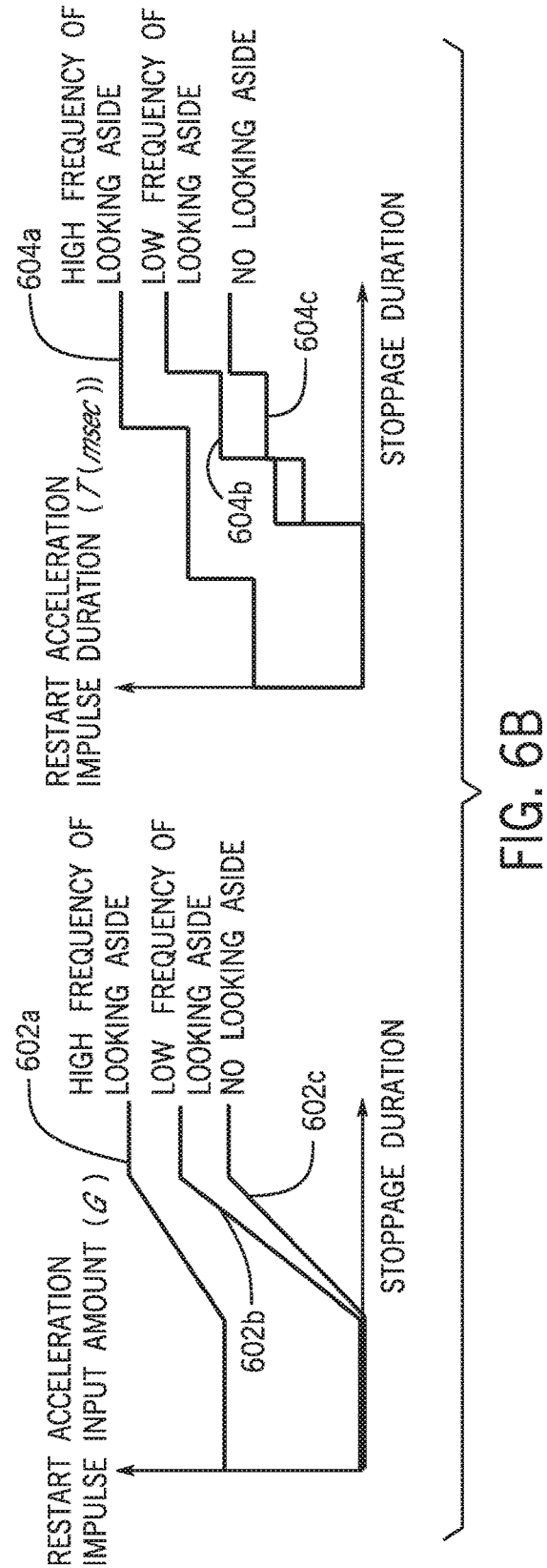
FIG. 6B is an illustration of an example of adjusting the amount of impulse acceleration and the duration of the impulse acceleration based on a driver road inattentiveness level according to an exemplary embodiment.

In one embodiment, the impulse acceleration output module 150 may adjust the amount of input acceleration G and the duration T of the input acceleration to be in accordance with the driver road inattentiveness level to provide a level of notification that may partly correspond to the level of road inattentiveness. For example, as illustrated in FIG. 6B, the amount of input acceleration 602a and the duration of time 604a of the input acceleration may be adjusted to a higher amount if the driver road inattentiveness level indicates a high frequency of looking aside for the predetermined period of time before and/or during the duration of the automated stoppage of the vehicle 102. Additionally, the amount of input acceleration 602b and the duration of time 604b of the input acceleration may be adjusted to an intermediate amount if the driver road inattentiveness level indicates a lower frequency of looking aside for the predetermined period of time before and/or during the duration of the automated stoppage of the vehicle 102. Further, the amount of input acceleration 602c and the duration of time 604c of the input acceleration may be adjusted to a lower amount if the driver road inattentiveness level indicates that the driver has looked and/or faced the roadway for the predetermined period of time before and/or during the duration of the automated stoppage of the vehicle 102.

Referring again to FIG. 5, the method 500 may proceed to block 506, wherein the method 500 may include adjusting the automated restart impulse acceleration and the duration of time of the automated restart impulse acceleration based on the driver steering inattentiveness level. As discussed above (with reference to block 404 of the method 400), upon determining the driver steering inattentiveness level, the countermeasure parameter module 148 may communicate the driver steering inattentiveness level to the impulse acceleration output module 150. In one embodiment, upon receipt of the driver steering inattentiveness level, the countermeasure parameter module 148 may adjust the amount of impulse acceleration G and the duration of time T of the impulse acceleration G based on the driver steering inattentiveness level G.

Figure 6C:
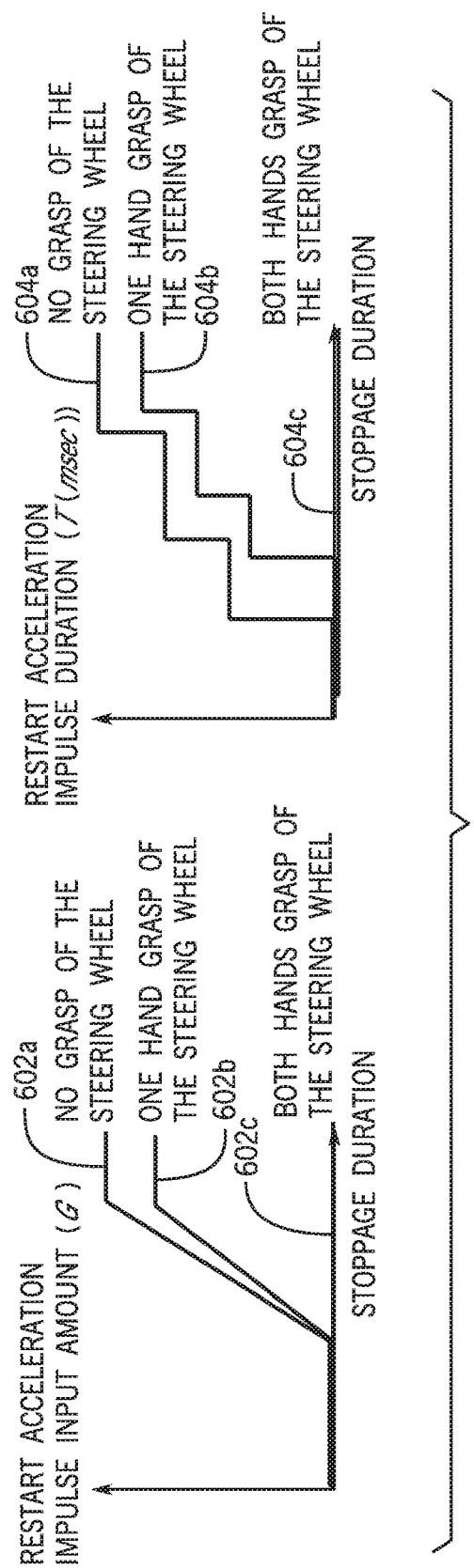
FIG. 6C is an illustration of an example of adjusting the amount of impulse acceleration and the duration of the impulse acceleration based on a driver steering inattentiveness level according to an exemplary embodiment.

In one embodiment, the impulse acceleration output module 150 may adjust the amount of input acceleration G and the duration T of the input acceleration to be in accordance with the driver steering inattentiveness level. For example, as illustrated in FIG. 6C, the amount of input acceleration 602a and the duration of time 604a of the input acceleration may be adjusted to a higher amount if the driver steering inattentiveness level indicates that the driver is not grasping the steering wheel with any hands for the predetermined period of time before and/or during the duration of the automated stoppage of the vehicle 102. Additionally, the amount of input acceleration 602b and the duration of time 604b of the input acceleration may be adjusted to an intermediate amount if the driver road inattentiveness level indicates that the driver is grasping the steering wheel with one hand for the predetermined period of time before and/or during the duration of the automated stoppage of the vehicle 102. Further, the amount of input acceleration 602c and the duration of time 604c of the input acceleration may be adjusted to a lower amount if the driver road inattentiveness level indicates that the driver is grasping the steering wheel with both hands for the predetermined period of time before and/or during the duration of the automated stoppage of the vehicle 102.

With reference again to FIG. 5, the method 500 may proceed to block 506, wherein the method 500 may include adjusting the automated restart impulse acceleration and the duration of time of the automated restart impulse based on the driver tiredness level. As discussed above (with reference to block 406 of the method 400), upon determining the driver tiredness level, the countermeasure parameter module 148 may communicate the determined driver tiredness level to the impulse acceleration output module 150. In one embodiment, upon receipt of the driver tiredness level, the countermeasure parameter module 148 may adjust the amount of impulse acceleration G and the duration of time T of the impulse acceleration G based on the driver tiredness level.

Figure 6D:
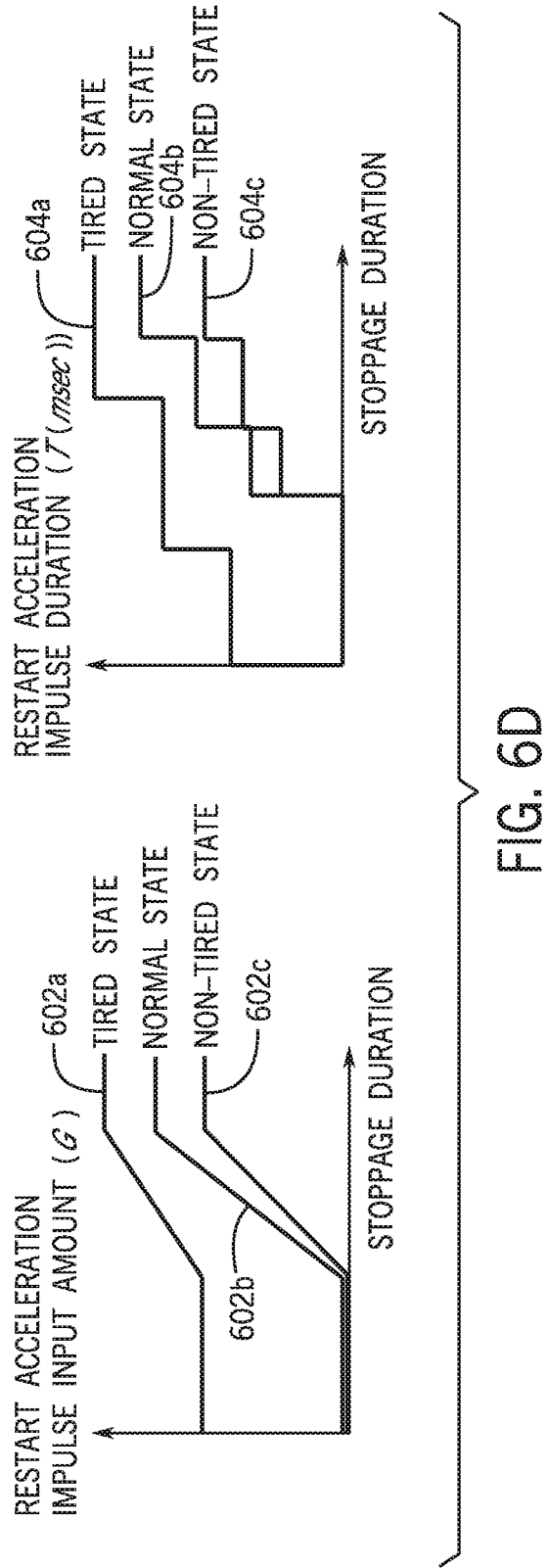
FIG. 6D is an illustration of an example of adjusting the amount of impulse acceleration and the duration of the impulse acceleration based on a driver tiredness level according to an exemplary embodiment.

In one embodiment, the impulse acceleration output module 150 may adjust the amount of input acceleration G and the duration T of the input acceleration to be in accordance with the driver tiredness level to provide a level of notification that corresponds to the level of tiredness. For example, as illustrated in FIG. 6D, the amount of input acceleration 602a and the duration of time 604a of the input acceleration may be adjusted to a higher amount if the driver tiredness level indicates that the driver is in a tired state (low state or awareness and alertness) for the predetermined period of time before and/or during the duration of the automated stoppage of the vehicle 102. Additionally, the amount of input acceleration 602b and the duration of time 604b of the input acceleration may be adjusted to an intermediate amount if the driver tiredness level indicates that the driver is in a normal state of awareness and alertness for the predetermined period of time before and/or during the duration of the automated stoppage of the vehicle 102. Further, the amount of input acceleration 602c and the duration of time 604c of the input acceleration may be adjusted to a lower amount if the driver tiredness level indicates that the driver is in a non-tired state (high state or awareness and alertness) for the predetermined period of time before and/or during the duration of the automated stoppage of the vehicle 102.

Referring again to the method 500 of FIG. 5, the method 500 may proceed to block 510, wherein the method 500 may include adjusting the automated restart impulse acceleration and the duration of time of the restart impulse acceleration based on the driver accident risk level. As discussed above (with reference to block 408 of the method 400), upon determining the driver accident risk level, the countermeasure parameter module 148 may communicate the determined driver accident risk level to the impulse acceleration output module 150. In one embodiment, upon receipt of the driver accident risk level, the countermeasure parameter module 148 may adjust the amount of impulse acceleration G and the duration of time T of the impulse acceleration G based on the driver accident risk level.

Figure 6E:
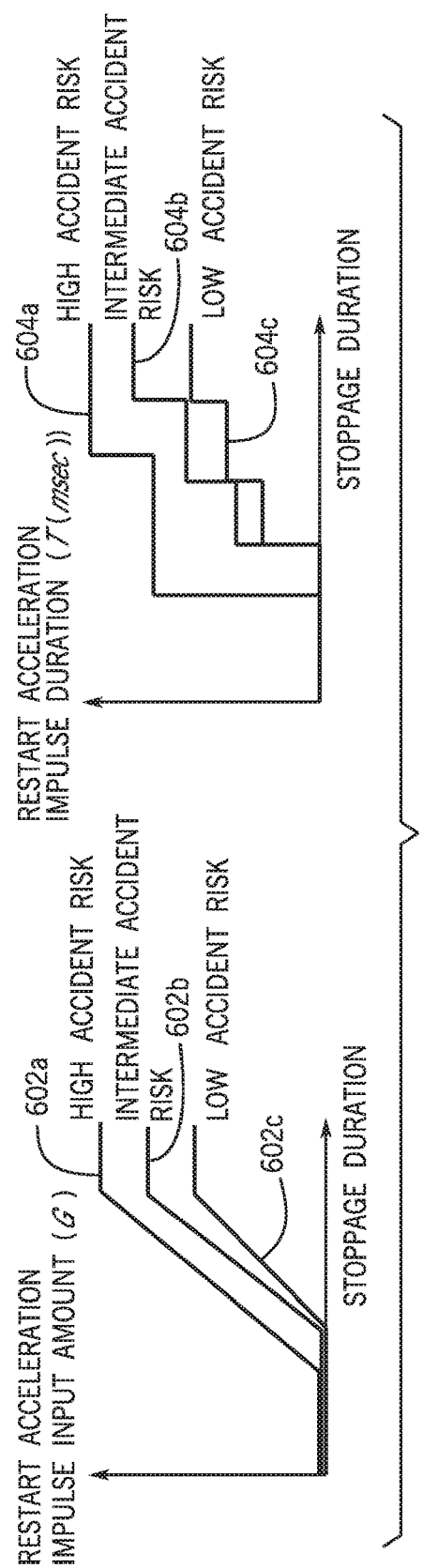
FIG. 6E is illustration of an example of adjusting the amount of impulse acceleration and the duration of the impulse acceleration based on a driver accident risk level according to an exemplary embodiment.

In one embodiment, the impulse acceleration output module 150 may adjust the amount of input acceleration G and the duration T of the input acceleration G to be in accordance with the driver accident risk level to provide a level of notification that corresponds to the level of accident risk associated with the driver of the vehicle 102. For example, as illustrated in FIG. 6E, the amount of input acceleration 602a and the duration of time 604a of the input acceleration may be adjusted to a higher amount if the driver accident risk level indicates that the driver is associated with a high accident risk based on numerous past accidents and/or high risk vehicle maneuvers that occurred at the location at which the automated stoppage of the vehicle 102 is occurring. Additionally, the amount of input acceleration 602b and the duration of time 604b of the input acceleration may be adjusted to an intermediate amount if the driver accident risk level indicates that the driver is associated with an intermediate accident risk based on numerous high risk maneuvers that occurred at the location at which the automated stoppage of the vehicle 102 is occurring. Further, the amount of input acceleration 602c and the duration of time 604c of the input acceleration may be adjusted to a lower amount if the driver accident risk level indicates that the driver is associated with a low accident risk based on no past accidents and no high risk vehicle maneuvers that occurred at the location at which the automated stoppage of the vehicle 102 is occurring.

Referring again to FIG. 5, the method 500 may proceed to block 512, wherein the method 500 may include adjusting the automated restart impulse acceleration and the duration of time based on the roadway terrain level. As discussed above (with reference to block 410 of the method 400), upon determining the roadway terrain level, the countermeasure parameter module 148 may communicate the determined roadway terrain level to the impulse acceleration output module 150. In one embodiment, upon receipt of the roadway terrain level, the countermeasure parameter module 148 may adjust the amount of impulse acceleration G and the duration of time T of the impulse acceleration G based on the roadway terrain level.

Figure 6F:
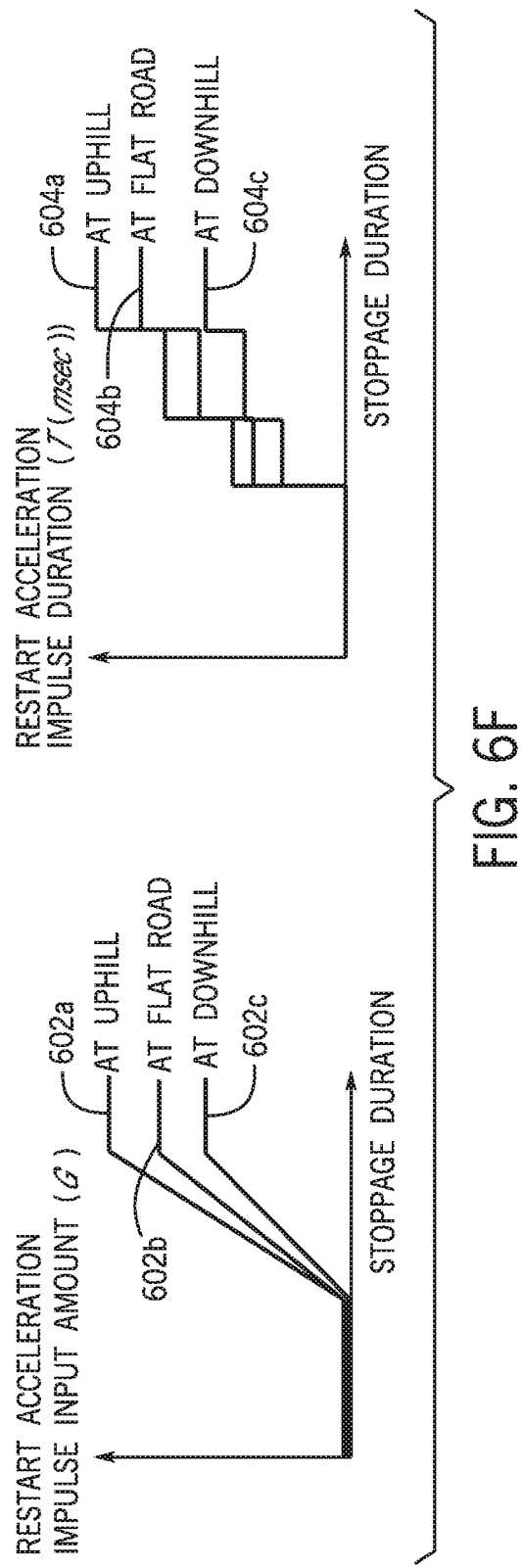
FIG. 6F is illustration of an example of adjusting the amount of impulse acceleration and the duration of the impulse acceleration based on a roadway terrain level according to an exemplary embodiment.

In one embodiment, the impulse acceleration output module 150 may adjust the amount of input acceleration G and the duration T of the input acceleration to be in accordance with the roadway terrain level to provide a level of notification that corresponds to the terrain of the roadway on which the vehicle 102 is located when the automated stoppage of the vehicle 102 occurs. For example, as illustrated in FIG. 6F, the amount of input acceleration 602a and the duration of time 604a of the input acceleration may be adjusted to a higher amount if the roadway terrain level indicates the terrain at location at which the automated stoppage of the vehicle 102 is occurring is upward sloping at a certain angle uphill. Additionally, the amount of input acceleration 602b and the duration of time 604b of the input acceleration may be adjusted to an intermediate amount if the terrain at location at which the automated stoppage of the vehicle 102 is occurring is not sloping and is flat. Further, the amount of input acceleration 602c and the duration of time 604c of the input acceleration may be adjusted to a lower amount if the roadway terrain level indicates the terrain at location at which the automated stoppage of the vehicle 102 is occurring is downward sloping at a certain angle downhill.

Referring again to the method 500 of FIG. 5, upon adjusting the automated restart impulse acceleration and the duration of time based on one or more of the countermeasure parameters (as discussed above with respect to blocks 504-512), the method 500 may proceed to block 514, wherein the method 500 may include outputting an aggregated restart impulse acceleration and an aggregated duration of time to the ECU 108. In an exemplary embodiment, upon determining the automated restart impulse acceleration for the duration of time based on the measured automated stoppage of the vehicle duration (as discussed with respect to block 502) and upon adjusting the automated restart impulse acceleration and the duration of time based on one or more of the countermeasure parameters, the impulse acceleration output module 150 may aggregate the determined output impulse acceleration G and the duration of time T with the one or more adjusted levels of the output impulse acceleration G and the duration of time T.

More specifically, the impulse acceleration output module 150 may determine G and T values for each of the adjustments of the automated restart acceleration and the duration of time and may aggregate the values into a single/combined G and T values that may be provided as the impulse acceleration G for the duration of time T. The impulse acceleration output module 150 may communicate one or more command signals that include data pertaining to the aggregated restart impulse acceleration and the aggregated duration of time to the ECU 108.

The method 500 may proceed to block 516, wherein the method 500 may include controlling the vehicle 102 to provide the restart impulse acceleration G for the duration of time T. In an exemplary embodiment, upon receiving the one or more command signals that include the data pertaining to the aggregated restart impulse acceleration, the ECU 108 may send one or more command signals to the accelerator 140 of the vehicle 102 to provide a level of acceleration that provides the restart impulse acceleration G for the duration of time T. Consequently, the accelerator 140 may be supplied with a requisite amount of power to automatically push the accelerator 140 to provide the restart impulse acceleration G for the duration of time T to notify the driver of the vehicle 102 of the automatic restart of vehicle movement being conducted by the ACC/LSF system 106.

In one or more embodiments, the ECU 108 may additionally send a signal to the head unit 110 of the vehicle 102 to provide a visual or audio notification to the driver of the vehicle 102 that may coincide with the restart impulse acceleration G for the duration of time T. The video or audio notification may also be provided at one or more varying levels that may correspond to the amount of restart impulse acceleration G. For example, the video or audio notification may include a flashing warning on an alert user interface associated with an audio alarm that is provided to notify the driver of the vehicle 102 of the automated restart of the vehicle movement.

The embodiments discussed herein can also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media excludes non-transitory tangible media and propagated data signals.

The invention claimed is:

1. A computer-implemented method for providing a notification of an automated restart of vehicle movement, comprising:
   determining an automated stoppage of a vehicle based on an operation of a low speed follow functionality of the vehicle;
   measuring a duration of the automated stoppage of the vehicle; and
   providing an impulse acceleration for a duration of time during the automated restart of the vehicle movement, wherein at least one of an amount of the impulse acceleration and the duration of time is based on the duration of the automated stoppage of the vehicle.

2. The computer-implemented method of claim 1, further comprising: determining at least one countermeasure parameter, wherein the at least one countermeasure parameter pertains to an operation of the vehicle for a predetermined period of time before the duration of the automated stoppage of the vehicle and during the automated stoppage of the vehicle, wherein at least one of the amount of the impulse acceleration and the duration of time is based on at least one countermeasure parameter.

3. The computer-implemented method of claim 2, wherein determining the at least one countermeasure parameter includes determining a driver road inattentiveness level, wherein the driver road inattentiveness level pertains to a level of driver inattentiveness to a roadway on which the vehicle is traveling exhibited by a driver of the vehicle for the predetermined period of time before the duration of the automated stoppage of the vehicle and during the automated stoppage of the vehicle.

4. The computer-implemented method of claim 2, wherein determining the at least one countermeasure parameter includes determining a driver steering inattentiveness level, wherein the driver steering inattentiveness level pertains to a level of driver attentiveness to steering the vehicle exhibited by a driver of the vehicle for the predetermined period of time before the duration of the automated stoppage of the vehicle and during the automated stoppage of the vehicle.

5. The computer-implemented method of claim 2, wherein determining the at least one countermeasure parameter includes determining a driver tiredness level, wherein the driver tiredness level pertains to a level of driver awareness and alertness exhibited by the driver of the vehicle for the predetermined period of time before the duration of the automated stoppage of the vehicle and during the automated stoppage of the vehicle.

6. The computer-implemented method of claim 2, wherein determining the at least one countermeasure parameter includes determining a driver accident risk level, wherein the driver accident risk level pertains to a level of accident risk associated with the driver of the vehicle and within a predetermined distance of a location at which the automated stoppage of the vehicle occurs, wherein the driver accident risk level is derived from an accident history and from historic vehicle dynamics data indicative of high risk driving maneuvers that occurred at the location.

7. The computer-implemented method of claim 2, wherein determining the at least one countermeasure parameter includes determining a roadway terrain level, wherein the roadway terrain level pertains to a terrain of the roadway at a location at which the automated stoppage of the vehicle occurs, wherein the roadway terrain level is indicative of a slope and angle of the slope of the roadway at the location.

8. The computer-implemented method of claim 1, wherein the impulse acceleration is not provided when the duration of the automated stoppage of the vehicle is less than a threshold.

9. The computer-implemented method of claim 1, wherein the amount of impulse acceleration is higher than an amount of an acceleration of the automated restart of the vehicle movement without the impulse acceleration.

10. A system for providing a notification of an automated restart of vehicle movement, comprising:
a memory storing instructions when executed by a processor cause the processor to:
determine an automated stoppage of a vehicle based on an operation of a low speed follow functionality of the vehicle;
measure a duration of the automated stoppage of the vehicle; and
provide an impulse acceleration for a duration of time during the automated restart of the vehicle movement, wherein at least one of an amount of the impulse acceleration and the duration of time is based on the duration of the automated stoppage of the vehicle.

11. The system of claim 10, further comprising:
determining at least one countermeasure parameter, wherein the at least one countermeasure parameter pertains to an operation of the vehicle for the predetermined period of time before the duration of the automated stoppage of the vehicle and during the automated stoppage of the vehicle, wherein at least one of the amount of the impulse acceleration and the duration of time is based on at least one countermeasure parameter.

12. The system of claim 11, wherein determining the at least one countermeasure parameter includes determining a driver road inattentiveness level, wherein the driver road inattentiveness level pertains to a level of driver inattentiveness to a roadway on which the vehicle is traveling exhibited by a driver of the vehicle for the predetermined period of time before the duration of the automated stoppage of the vehicle and during the automated stoppage of the vehicle.

13. The system of claim 11, wherein determining the at least one countermeasure parameter includes determining a driver steering inattentiveness level, wherein the driver steering inattentiveness level pertains to a level of driver attentiveness to steering the vehicle exhibited by a driver of the vehicle for the predetermined period of time before the duration of the automated stoppage of the vehicle and during the automated stoppage of the vehicle.

14. The system of claim 11, wherein determining the at least one countermeasure parameter includes determining a driver tiredness level, wherein the driver tiredness level pertains to a level of driver awareness and alertness exhibited by the driver of the vehicle for the predetermined period of time before the duration of the automated stoppage of the vehicle and during the automated stoppage of the vehicle.

15. The system of claim 11, wherein determining the at least one countermeasure parameter includes determining a driver accident risk level, wherein the driver accident risk level pertains to a level of accident risk associated with the driver of the vehicle and within a predetermined distance of a location at which the automated stoppage of the vehicle occurs, wherein the driver accident risk level is derived from an accident history and from historic vehicle dynamics data indicative of high risk driving maneuvers that occurred at the location.

16. The system of claim 11, wherein determining the at least one countermeasure parameter includes determining a roadway terrain level, wherein the roadway terrain level pertains to a terrain of the roadway at a location at which the automated stoppage of the vehicle occurs, wherein the roadway terrain level is indicative of a slope and angle of the slope of the roadway at the location.

17. The system of claim 10, wherein the impulse acceleration is not provided when the duration of the automated stoppage of the vehicle is less than a threshold.

18. The system of claim 10, wherein the amount of impulse acceleration is higher than an amount of an acceleration of the automated restart of the vehicle movement without the impulse acceleration.

19. A non-transitory computer readable storage medium storing instructions that, when executed by a computer, which includes at least a processor, causes the computer to perform a method, the method comprising:
- determining an automated stoppage of a vehicle based on an operation of a low speed follow functionality of the vehicle;
- measuring a duration of the automated stoppage of the vehicle; and
- providing an impulse acceleration for a duration of time during an automated restart of vehicle movement, wherein at least one of an amount of the impulse acceleration and the duration of time is based on the duration of the automated stoppage of the vehicle.

20. The non-transitory computer readable storage medium of claim 19, further comprising:
- determining at least one countermeasure parameter, wherein the at least one countermeasure parameter pertains to an operation of the vehicle for a predetermined period of time before the duration of the automated stoppage of the vehicle and during the automated stoppage of the vehicle, wherein at least one of the amount of the impulse acceleration and the duration of time is based on at least one countermeasure parameter.

* * * * *